US010523306B2

(12) United States Patent
Ng et al.

(10) Patent No.: US 10,523,306 B2
(45) Date of Patent: Dec. 31, 2019

(54) OMNIDIRECTIONAL MULTIBAND SYMMETRICAL DIPOLE ANTENNAS

(71) Applicant: Laird Technologies, Inc., Earth City, MO (US)

(72) Inventors: Kok Jiunn Ng, Penang (MY); Ting Hee Lee, Penang (MY)

(73) Assignee: Laird Technologies, Inc., Chesterfield, MO (US)

( * ) Notice: Subject to any disclaimer, the term of this patent is extended or adjusted under 35 U.S.C. 154(b) by 140 days.

(21) Appl. No.: 15/679,496

(22) Filed: Aug. 17, 2017

(65) Prior Publication Data
US 2018/0062731 A1 Mar. 1, 2018

(30) Foreign Application Priority Data
Aug. 23, 2016 (MY) .............................. PI2016703073

(51) Int. Cl.
*H04B 7/155* (2006.01)
*H01Q 1/50* (2006.01)
*H01Q 21/30* (2006.01)
*H01Q 9/28* (2006.01)
*H01Q 5/371* (2015.01)
*H01Q 5/50* (2015.01)
*H01Q 21/28* (2006.01)
*H01Q 9/26* (2006.01)
*H04B 7/0452* (2017.01)

(52) U.S. Cl.
CPC .......... *H04B 7/1555* (2013.01); *H01Q 5/371* (2015.01); *H01Q 5/50* (2015.01); *H01Q 9/285* (2013.01); *H01Q 21/30* (2013.01); *H01Q 9/265* (2013.01); *H01Q 21/28* (2013.01); *H04B 7/0452* (2013.01)

(58) Field of Classification Search
CPC .......... H01Q 5/371; H01Q 21/30; H01Q 5/50; H01Q 9/285; H01Q 9/20; H01Q 9/04; H01Q 21/28; H04B 7/1555; H04B 7/155; H04B 7/0452
USPC .................................. 343/793, 795, 700 MS
See application file for complete search history.

(56) References Cited

U.S. PATENT DOCUMENTS

| | | | |
|---|---|---|---|
| 6,239,765 B1 | 5/2001 | Johnson et al. |
| 6,337,667 B1 | 1/2002 | Ayala et al. |
| 6,891,506 B2 | 5/2005 | Jarmuszewski et al. |
| 8,081,130 B2 | 12/2011 | Apostolos et al. |
| 8,184,060 B2 | 5/2012 | Du et al. |
| 8,810,467 B2 | 8/2014 | Lee et al. |
| 8,866,685 B2 | 10/2014 | Lee et al. |

(Continued)

FOREIGN PATENT DOCUMENTS

| | | |
|---|---|---|
| CN | 203631723 | 6/2014 |
| JP | 3628668 B2 | 3/2005 |

(Continued)

OTHER PUBLICATIONS

European Search Report dated Jan. 26, 2018 for EP Application No. 17187251.8 which claims priority to the instant application; 14 pages.

(Continued)

*Primary Examiner* — Hai V Tran
(74) *Attorney, Agent, or Firm* — Harness, Dickey & Pierce, P.L.C.; Anthony G. Fussner

(57) ABSTRACT

Disclosed herein are various exemplary embodiments of omnidirectional multiband symmetrical dipole antennas.

21 Claims, 24 Drawing Sheets

(56) References Cited

U.S. PATENT DOCUMENTS

| | | | |
|---|---|---|---|
| 9,203,154 B2 | 12/2015 | Korva | |
| 2009/0009399 A1* | 1/2009 | Gaucher | ............ H01Q 21/0006 |
| | | | 343/700 MS |
| 2010/0164810 A1* | 7/2010 | Chou | ....................... H01Q 9/16 |
| | | | 343/700 MS |
| 2012/0169560 A1* | 7/2012 | Lee | .......................... H01O 5/00 |
| | | | 343/770 |
| 2014/0361946 A1* | 12/2014 | Ganchrow | ............. H01Q 9/285 |
| | | | 343/795 |
| 2015/0303579 A1* | 10/2015 | Yang | ....................... H01Q 1/38 |
| | | | 343/795 |

FOREIGN PATENT DOCUMENTS

| | | |
|---|---|---|
| KR | 20110054223 A | 5/2011 |
| WO | WO-2011053107 A1 | 5/2011 |
| WO | WO-2014/058928 A1 | 4/2014 |
| WO | WO-2015/147906 A1 | 10/2015 |

OTHER PUBLICATIONS

European Office Action for EP Application No. 17187251.8 which claims priority to the instant application, dated Apr. 16, 2019, 7 pages.

\* cited by examiner

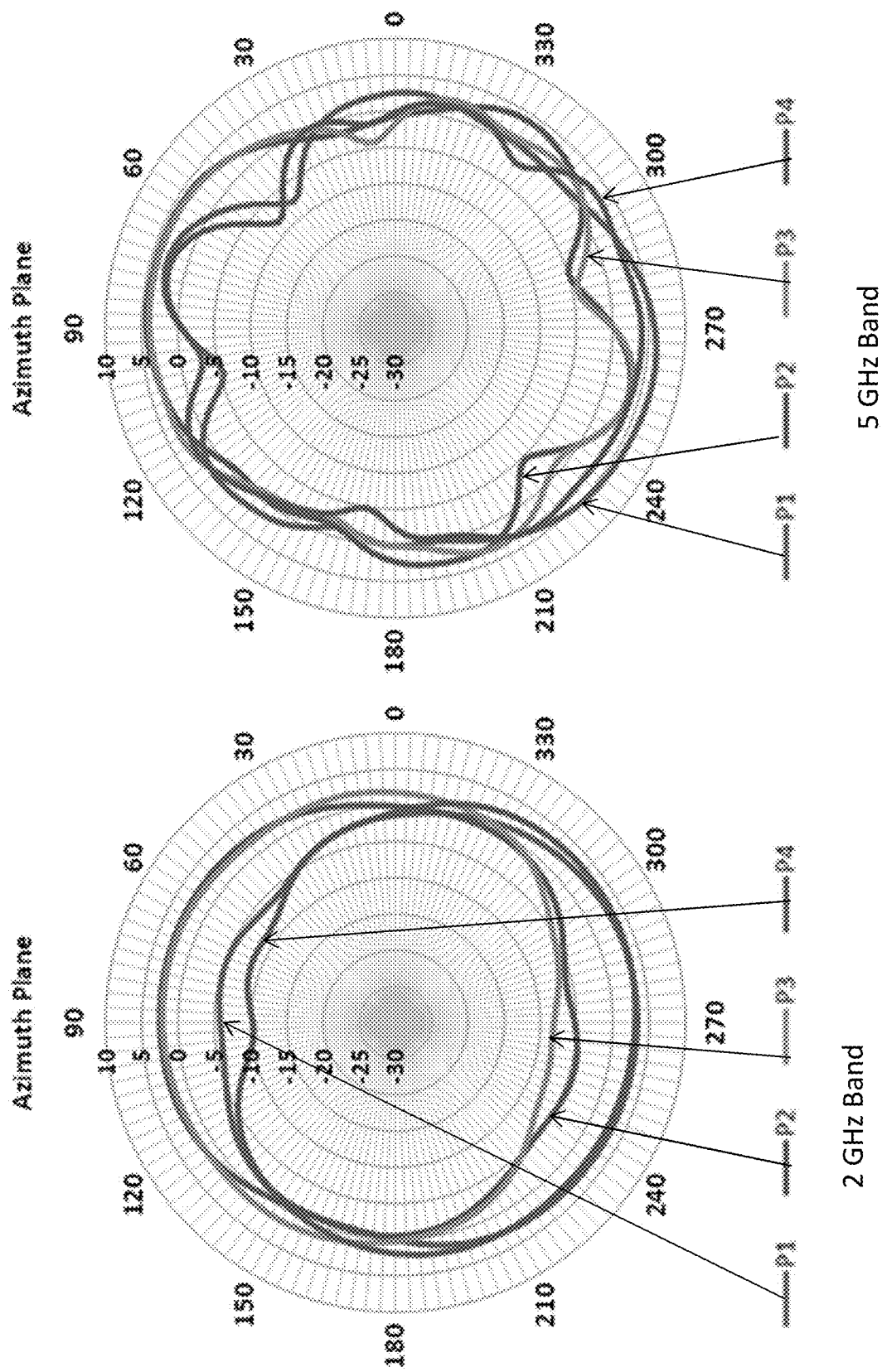

5 GHz Band

2 GHz Band

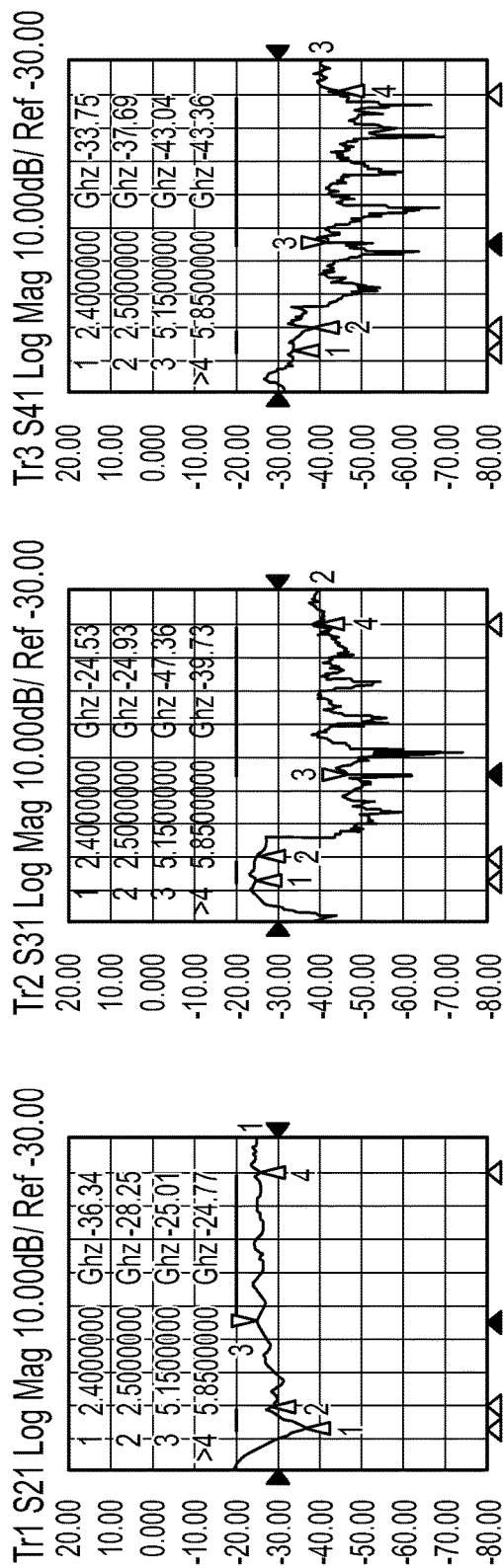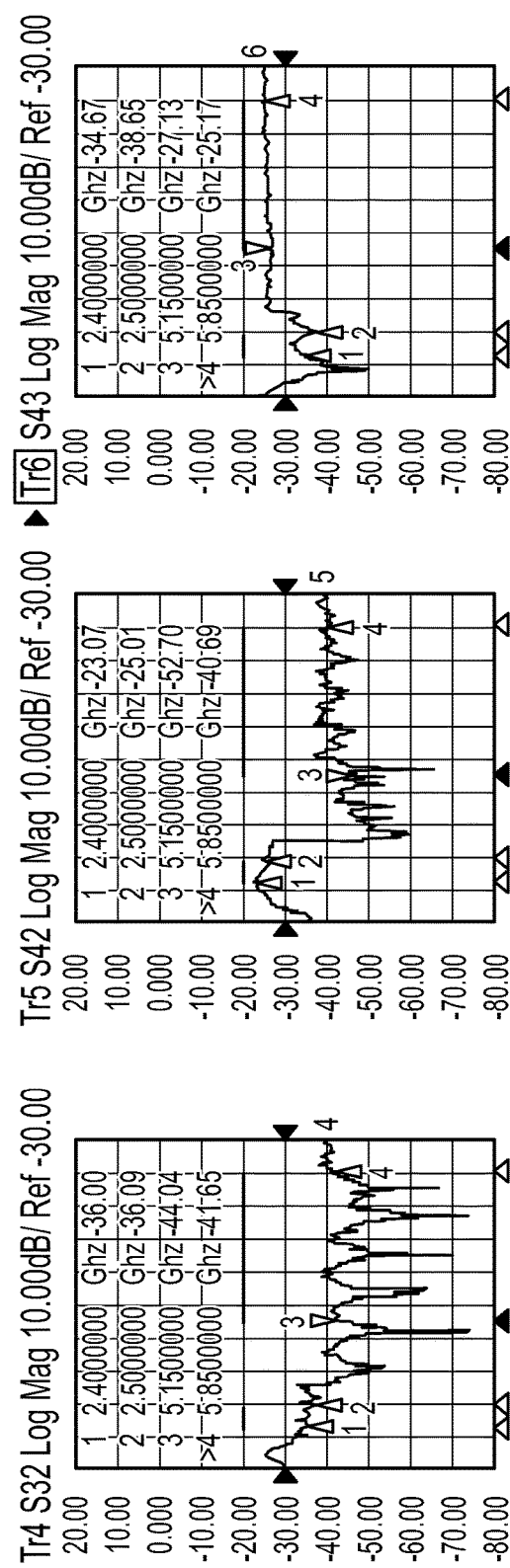
FIG. 19

Port 1

| Frequency (MHz) | 3D | | | Azimuth | | | Elevation 0° | | | Elevation 90° | | |
|---|---|---|---|---|---|---|---|---|---|---|---|---|
| | Efficiency | Max Gain | Max Gain | Average Gain | Ripple | Max Gain | Average Gain | Beamwidth | Max Gain | Average Gain | Beamwidth |
| 2400 | 55% | 4.04 | 3.46 | 0.23 | 7.98 | 3.94 | 3.24 | 43.52 | 0.55 | -3.22 | 90.30 |
| 2425 | 62% | 3.93 | 3.88 | 0.29 | 8.27 | 3.84 | 2.80 | 54.63 | 1.60 | -3.25 | 46.18 |
| 2450 | 65% | 4.67 | 4.56 | 1.06 | 8.10 | 4.54 | 2.67 | 46.30 | 1.82 | -3.54 | 44.99 |
| 2475 | 61% | 4.88 | 4.33 | 0.64 | 7.68 | 4.64 | 2.53 | 46.17 | 0.90 | -3.87 | 69.28 |
| 2500 | 62% | 4.14 | 3.95 | 0.29 | 8.24 | 3.82 | 2.57 | 29.61 | 1.06 | -3.93 | 70.07 |
| 5150 | 34% | 3.70 | 3.70 | -0.20 | 11.09 | 0.34 | 0.42 | 28.35 | 3.64 | -3.72 | 41.25 |
| 5220 | 39% | 4.08 | 4.08 | 0.48 | 11.48 | 1.36 | 5.55 | 27.81 | 3.95 | -3.54 | 39.54 |
| 5330 | 37% | 3.81 | 3.81 | 0.43 | 11.83 | 1.52 | 5.50 | 29.84 | 3.68 | -3.78 | 39.72 |
| 5440 | 34% | 3.50 | 3.50 | 0.07 | 13.70 | 1.36 | 6.01 | 27.89 | 3.48 | -4.01 | 38.54 |
| 5550 | 34% | 3.81 | 3.81 | 0.13 | 14.20 | 1.75 | 5.66 | 28.41 | 3.70 | -4.05 | 37.48 |
| 5660 | 36% | 3.76 | 3.76 | 0.30 | 12.37 | 2.72 | 4.90 | 29.83 | 3.46 | -4.52 | 35.71 |
| 5755 | 36% | 3.30 | 3.17 | 0.19 | 10.56 | 2.65 | 4.55 | 31.41 | 2.46 | -5.41 | 32.78 |
| 5800 | 33% | 3.85 | 3.70 | 0.23 | 15.00 | 2.70 | 5.10 | 28.35 | 1.99 | -5.53 | 32.64 |
| 5850 | 33% | 3.54 | 3.32 | 0.35 | 12.05 | 2.46 | 4.92 | 24.97 | 1.76 | -6.03 | 29.75 |

FIG. 20

Port 2

| Frequency (MHz) | 3D Efficiency | 3D Max Gain | Azimuth Max Gain | Azimuth Average Gain | Azimuth Ripple | Elevation 0° Max Gain | Elevation 0° Average Gain | Elevation 0° Beamwidth | Elevation 90° Max Gain | Elevation 90° Average Gain | Elevation 90° Beamwidth |
|---|---|---|---|---|---|---|---|---|---|---|---|
| 2400 | 60% | 4.09 | 3.49 | -0.27 | 7.66 | 2.94 | 3.38 | 51.85 | 0.67 | -3.01 | 86.23 |
| 2425 | 65% | 4.75 | 4.64 | 0.81 | 8.62 | 3.38 | 3.08 | 52.88 | 1.75 | -3.22 | 40.06 |
| 2450 | 67% | 5.21 | 4.84 | 1.29 | 7.51 | 4.00 | 2.79 | 45.60 | 1.50 | -3.56 | 47.61 |
| 2475 | 65% | 4.83 | 4.16 | 0.50 | 7.30 | 3.48 | 2.70 | 57.51 | 0.83 | -3.59 | 72.33 |
| 2500 | 66% | 4.28 | 4.25 | 0.56 | 7.98 | 3.31 | 2.78 | 64.97 | 0.74 | -3.93 | 41.55 |
| 5150 | 36% | 3.95 | 3.93 | 0.00 | 13.19 | 1.39 | 3.69 | 35.62 | 2.73 | -3.86 | 43.32 |
| 5250 | 40% | 4.14 | 4.12 | 0.56 | 13.42 | 2.54 | 4.83 | 33.83 | 2.95 | -3.88 | 40.97 |
| 5350 | 39% | 4.18 | 4.12 | 0.64 | 14.24 | 2.93 | 4.89 | 30.98 | 3.15 | -3.96 | 38.43 |
| 5450 | 36% | 3.83 | 3.80 | 0.21 | 16.18 | 2.38 | 5.32 | 29.04 | 2.64 | -4.33 | 35.94 |
| 5550 | 35% | 3.99 | 3.94 | 0.12 | 17.71 | 2.46 | 5.10 | 29.79 | 1.79 | -4.76 | 35.33 |
| 5650 | 36% | 3.77 | 3.77 | 0.19 | 17.68 | 2.80 | 4.68 | 29.60 | 0.82 | -5.62 | 34.55 |
| 5755 | 37% | 3.31 | 3.31 | 0.19 | 14.78 | 3.31 | 4.37 | 30.07 | 0.50 | -6.09 | 31.83 |
| 5800 | 31% | 3.31 | 3.31 | -0.36 | 16.65 | 3.31 | 4.90 | 28.20 | 0.31 | -6.06 | 35.08 |
| 5850 | 34% | 3.54 | 3.50 | -0.29 | 15.37 | 3.54 | 4.50 | 29.26 | 0.07 | -6.48 | 31.94 |

FIG. 21

Port 3

| Frequency (MHz) | Efficiency | 3D Max Gain | Azimuth Max Gain | Azimuth Average Gain | Azimuth Ripple | Elevation 0° Max Gain | Elevation 0° Average Gain | Elevation 0° Beamwidth | Elevation 90° Max Gain | Elevation 90° Average Gain | Elevation 90° Beamwidth |
|---|---|---|---|---|---|---|---|---|---|---|---|
| 2400 | 60% | 3.41 | 2.79 | 0.10 | 13.52 | 3.38 | 3.80 | 42.60 | 1.04 | -2.46 | 91.68 |
| 2425 | 64% | 3.31 | 3.18 | 0.51 | 13.40 | 3.25 | 3.33 | 60.65 | 1.65 | -2.61 | 82.43 |
| 2450 | 66% | 4.26 | 3.96 | 1.09 | 13.84 | 4.14 | 3.10 | 51.52 | 1.45 | -2.90 | 71.09 |
| 2475 | 65% | 3.99 | 3.26 | 0.45 | 13.58 | 3.91 | 3.08 | 61.12 | 1.17 | -2.79 | 82.74 |
| 2500 | 66% | 3.46 | 3.36 | 0.55 | 13.54 | 3.29 | 3.00 | 67.71 | 2.07 | -2.68 | 57.76 |
| 5150 | 47% | 3.88 | 3.81 | 0.88 | 10.30 | 3.00 | 5.10 | 28.46 | 3.84 | -3.09 | 49.05 |
| 5250 | 48% | 3.78 | 3.76 | 0.98 | 9.02 | 2.82 | 4.99 | 30.19 | 3.78 | -3.30 | 46.58 |
| 5350 | 48% | 3.80 | 3.72 | 1.02 | 9.10 | 2.92 | 4.66 | 31.47 | 3.69 | -3.41 | 46.84 |
| 5450 | 47% | 3.54 | 3.29 | 0.94 | 7.92 | 2.44 | 4.58 | 32.79 | 3.27 | -3.87 | 46.03 |
| 5550 | 46% | 3.45 | 3.20 | 0.90 | 7.45 | 2.57 | 4.39 | 32.88 | 3.19 | -4.32 | 40.56 |
| 5650 | 45% | 3.22 | 2.88 | 0.76 | 6.46 | 2.63 | 4.33 | 32.16 | 3.02 | -4.65 | 34.75 |
| 5750 | 44% | 3.38 | 2.79 | 0.52 | 6.05 | 2.66 | 4.17 | 32.64 | 3.01 | -4.84 | 33.75 |
| 5800 | 43% | 3.02 | 2.86 | 0.27 | 7.52 | 2.83 | 4.15 | 34.12 | 2.96 | -4.99 | 39.39 |
| 5850 | 44% | 3.48 | 2.99 | 0.30 | 5.93 | 2.70 | 4.00 | 32.15 | 3.28 | -4.72 | 32.27 |

FIG. 22

Port 4

| Frequency (MHz) | 3D | | | Azimuth | | | Elevation 0° | | | Elevation 90° | | |
|---|---|---|---|---|---|---|---|---|---|---|---|---|
| | Efficiency | Max Gain | Max Gain | Average Gain | Ripple | Max Gain | Average Gain | Beamwidth | Max Gain | Average Gain | Beamwidth |
| 2400 | 64% | 4.08 | 3.40 | 0.35 | 13.84 | 3.27 | 3.66 | 40.23 | 2.04 | -2.36 | 78.24 |
| 2425 | 67% | 3.95 | 3.93 | 0.89 | 12.23 | 2.69 | 3.33 | 64.30 | 2.87 | -2.36 | 50.22 |
| 2450 | 69% | 4.58 | 4.50 | 1.42 | 13.24 | 3.43 | 3.47 | 53.35 | 2.82 | -2.48 | 56.82 |
| 2475 | 66% | 4.32 | 3.88 | 0.82 | 14.77 | 3.30 | 3.62 | 64.72 | 2.75 | -2.50 | 67.40 |
| 2500 | 69% | 3.83 | 3.74 | 0.73 | 11.84 | 2.25 | 3.42 | 71.46 | 2.81 | -2.59 | 58.46 |
| 5150 | 47% | 4.22 | 4.21 | 0.90 | 11.45 | 1.55 | 5.45 | 28.16 | 2.65 | -3.00 | 46.31 |
| 5250 | 47% | 4.20 | 4.17 | 0.90 | 11.24 | 2.28 | 4.97 | 30.61 | 2.19 | -3.11 | 49.02 |
| 5350 | 47% | 4.12 | 4.09 | 0.91 | 9.68 | 2.04 | 4.93 | 31.22 | 1.97 | -3.29 | 63.99 |
| 5450 | 44% | 3.59 | 3.42 | 0.61 | 8.24 | 1.84 | 4.92 | 27.80 | 0.86 | -4.21 | 48.51 |
| 5550 | 42% | 3.38 | 3.25 | 0.29 | 7.20 | 2.33 | 4.77 | 27.46 | 0.68 | -5.08 | 39.71 |
| 5650 | 39% | 2.69 | 2.39 | -0.24 | 7.50 | 2.39 | 5.00 | 28.29 | 0.23 | -5.86 | 28.42 |
| 5755 | 40% | 3.07 | 2.76 | 0.35 | 8.22 | 2.79 | 4.79 | 30.61 | 0.58 | -5.79 | 26.77 |
| 5800 | 41% | 3.29 | 2.71 | -0.27 | 11.24 | 2.77 | 4.61 | 29.08 | 0.70 | -5.47 | 24.73 |
| 5850 | 42% | 3.72 | 2.95 | 0.30 | 9.06 | 3.41 | 4.34 | 30.34 | 1.31 | -5.34 | 26.14 |

FIG. 23

5 GHz Band

2 GHz Band

OMNIDIRECTIONAL MULTIBAND SYMMETRICAL DIPOLE ANTENNAS

CROSS-REFERENCE TO RELATED APPLICATION

This application claims the benefit of and priority to Malaysian Patent Application No. PI 2016703073 filed Aug. 23, 2016. The entire disclosure of the above application is incorporated herein by reference.

FIELD

The present disclosure relates to omnidirectional multiband symmetrical dipole antennas.

BACKGROUND

This section provides background information related to the present disclosure which is not necessarily prior art.

Wireless network infrastructure has been evolved to the needs to enhance capacity and throughput of the wireless application devices, such as laptop computers, cellular phones, etc. Consequently, multiple frequency bands and multiple antennas (e.g., Multiple Input Multiple Output) with higher gain are utilized to accommodate the needs of the wireless network application.

FIG. 1 illustrates a conventional half-wave dipole antenna 100. The antenna 100 includes a radiator element 102 and a ground element 104. The radiator element 102 and the ground element 104 are connected to, and fed by, a signal feed 106. Each of the radiator element 102 and the ground element 104 has an electrical length of about one quarter of the wavelength ($\lambda/4$) of a signal at a desired resonant frequency of the antenna. Together, the radiator element 102 and the ground element 104 have a combined electrical length 108 of about one half of the wavelength ($\lambda/2$) of signals at one desired resonant frequency of the antenna 100.

In addition, omnidirectional antennas are generally preferable in most applications as they allow for good transmission and reception from a mobile unit in various directions. Generally, an omnidirectional antenna is an antenna that radiates power generally uniformly in one plane with a directive pattern shape in a perpendicular plane, where the pattern is often described as "donut shaped."

One type of omnidirectional antenna is a collinear antenna. Collinear antennas are relatively high gain antennas that are used as external antennas for wireless local area network (WLAN) applications, such as wireless modems, etc. This is because collinear antennas have relative high gain and omnidirectional gain patterns.

Collinear antennas consist of in-phase arrays of radiating elements to enhance the gain performance. But collinear antennas are limited in that they are only operable as single band high gain antennas and may not be optimum for large bandwidth or multiple frequencies. By way of example, FIG. 2 illustrates a conventional collinear antenna 200 including upper and lower radiator elements 202, 204 each having an electrical length of about one half of the wavelength ($\lambda/2$) of a signal at a desired resonant frequency of the antenna 200.

In order to achieve high gain for more than a single band, back-to-back dualband dipoles may be placed on opposite sides of a printed circuit board. For example, FIGS. 3 through 5 illustrate a conventional antenna 300 having back-to-back dipoles such that the antenna 300 is operable over two bands, specifically the 2.45 gigahertz (GHz) band (from 2.4 GHz to 2.5 GHz) and the 5 GHz band (from 4.9 GHz to 5.875 GHz). For this conventional antenna 300, there are an upper pair of dipoles 302, 304 operating on the 2.45 GHz band and two lower pairs of dipoles 306, 308, 310, 312 operating on the 5 GHz band. FIG. 3 illustrates the dipoles 302, 306, 308 on the front of the printed circuit board (PCB) 314, while FIG. 5 illustrates the dipoles 304, 310, 312 on the back of the PCB 314. The antenna 300 also includes microstrip line or feeding network 316 with a power divider to feed and divide the power to each of the various antenna elements.

DRAWINGS

The drawings described herein are for illustrative purposes only of selected embodiments and not all possible implementations, and are not intended to limit the scope of the present disclosure.

FIG. 9 shows a microstrip line and FIG. 10 shows a tapering ground element;

Figure 11:
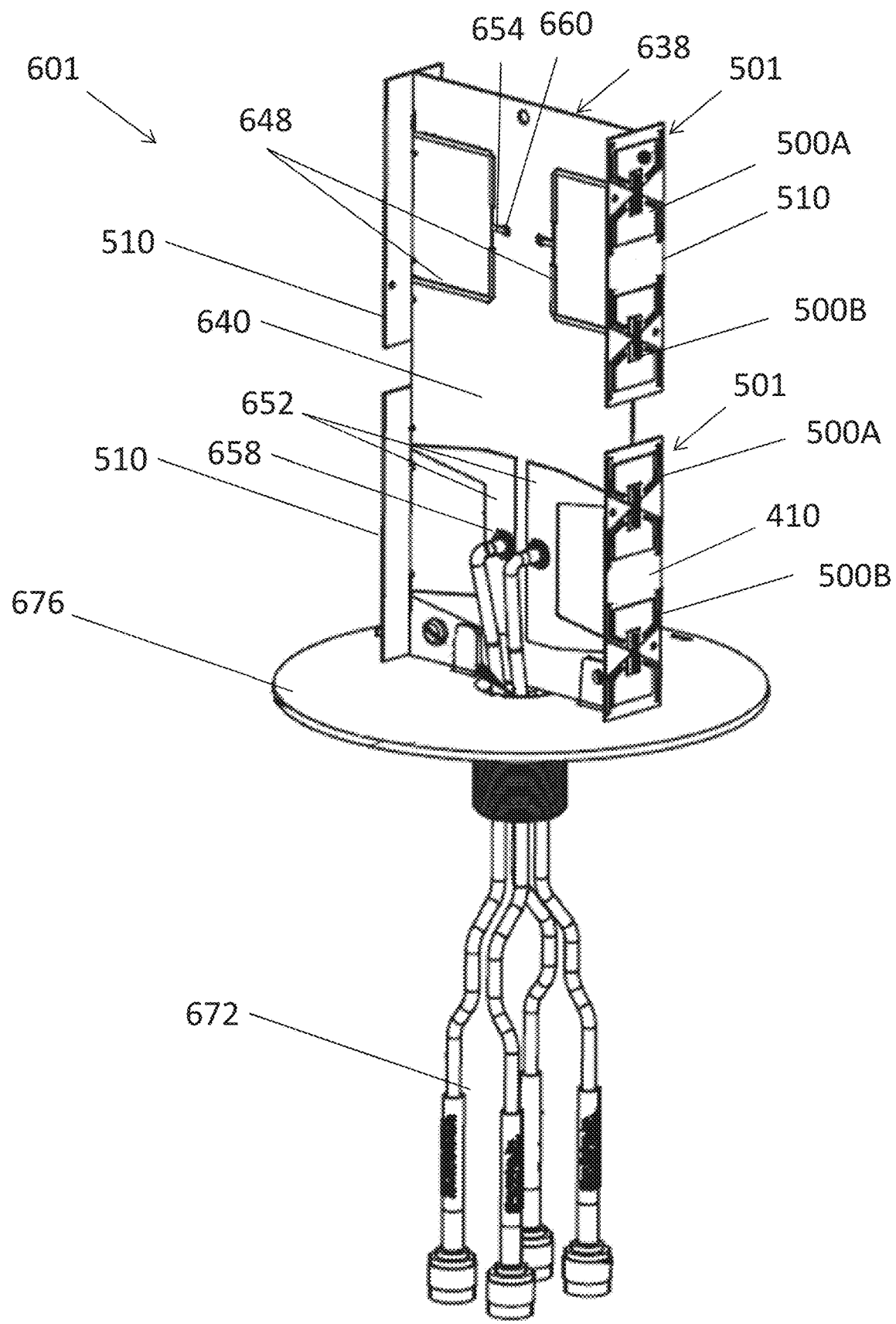
FIG. 11 is a perspective view of a multiport dual band high gain antenna assembly including four of the two-dipole array PCBs shown in FIG. 8 and an RF signal feeding network PCB for feeding RF signals to the four two-dipole array PCBs according to an exemplary embodiment.
Figure 12:
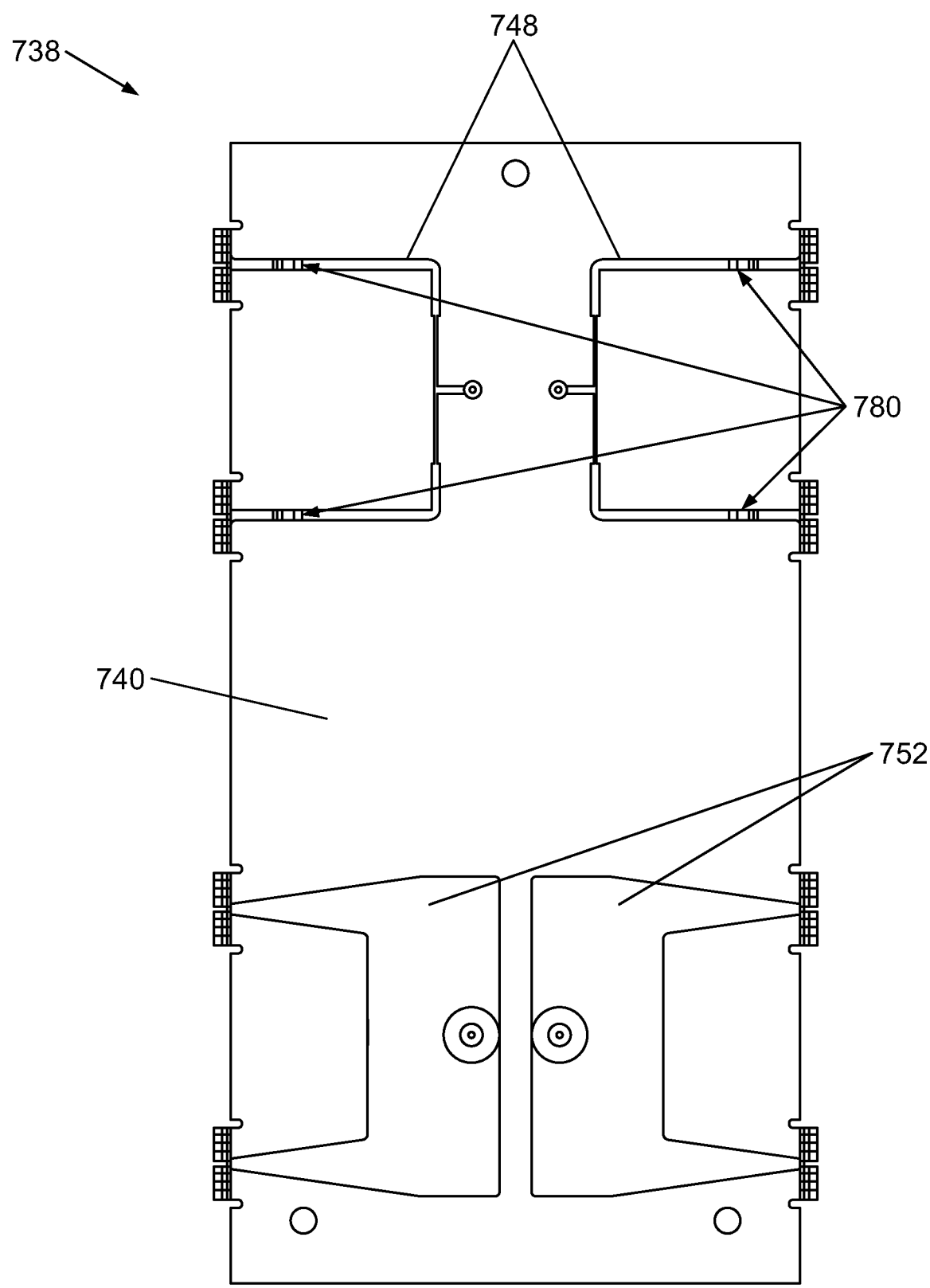
FIG. 12 illustrates another example of an RF signal feeding network PCB that may be used for feeding RF signals to the four two-dipole array PCBs of the multiport dual band high gain antenna assembly shown in FIG. 11 according to an exemplary embodiment, and illustrating four resistors along the microstrip line copper traces.
Figure 13:
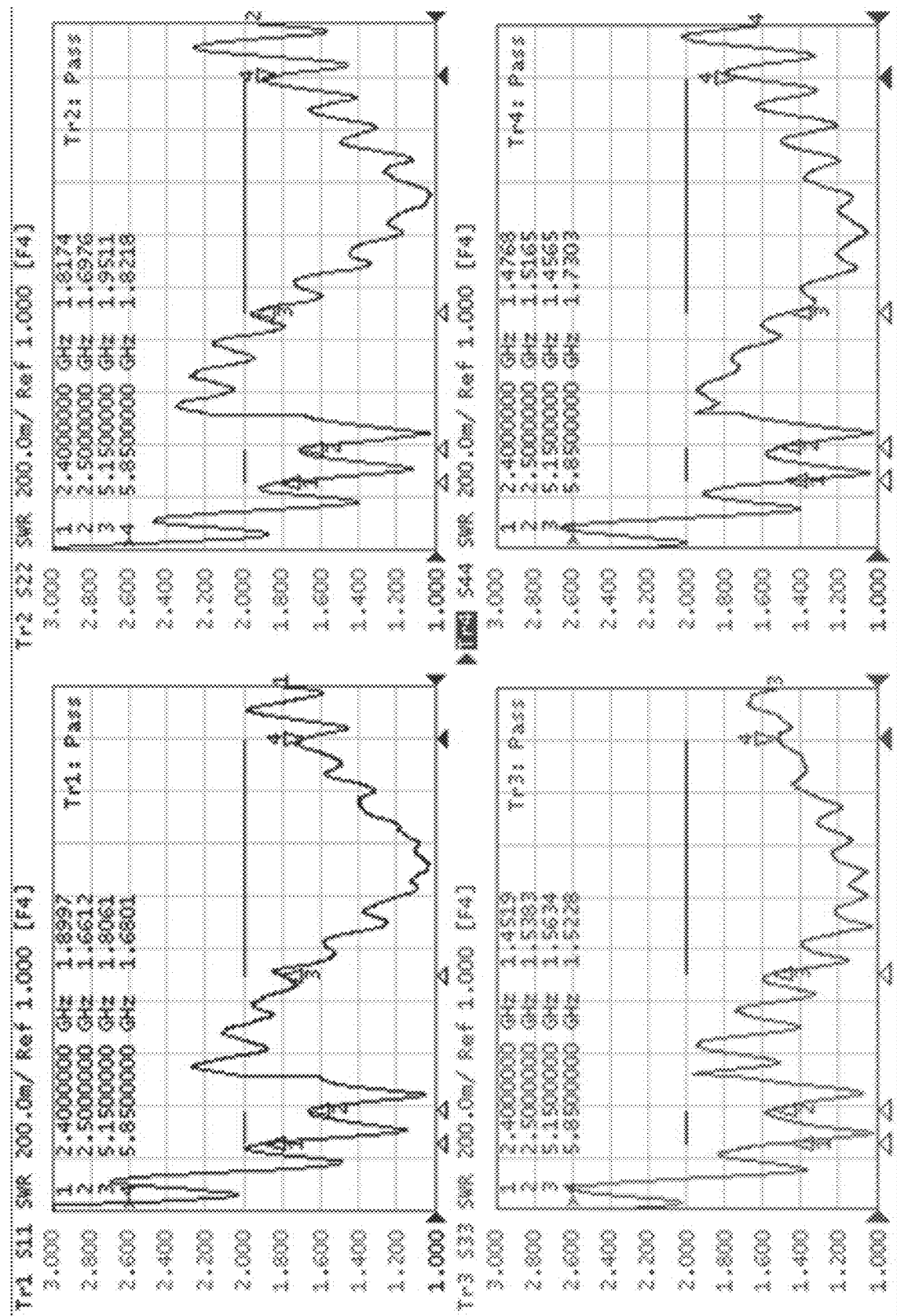
Figure 14:
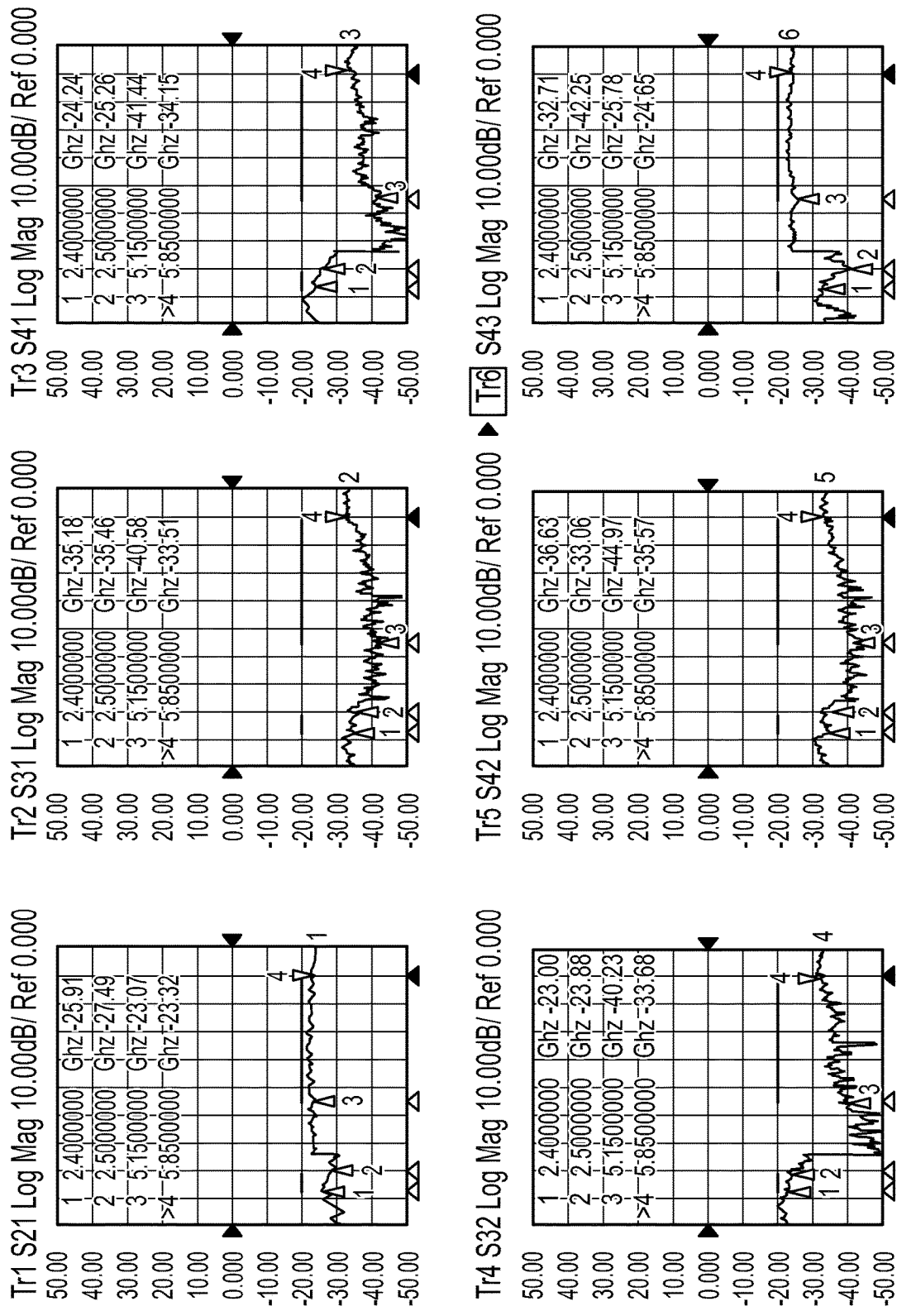
Figure 16B:
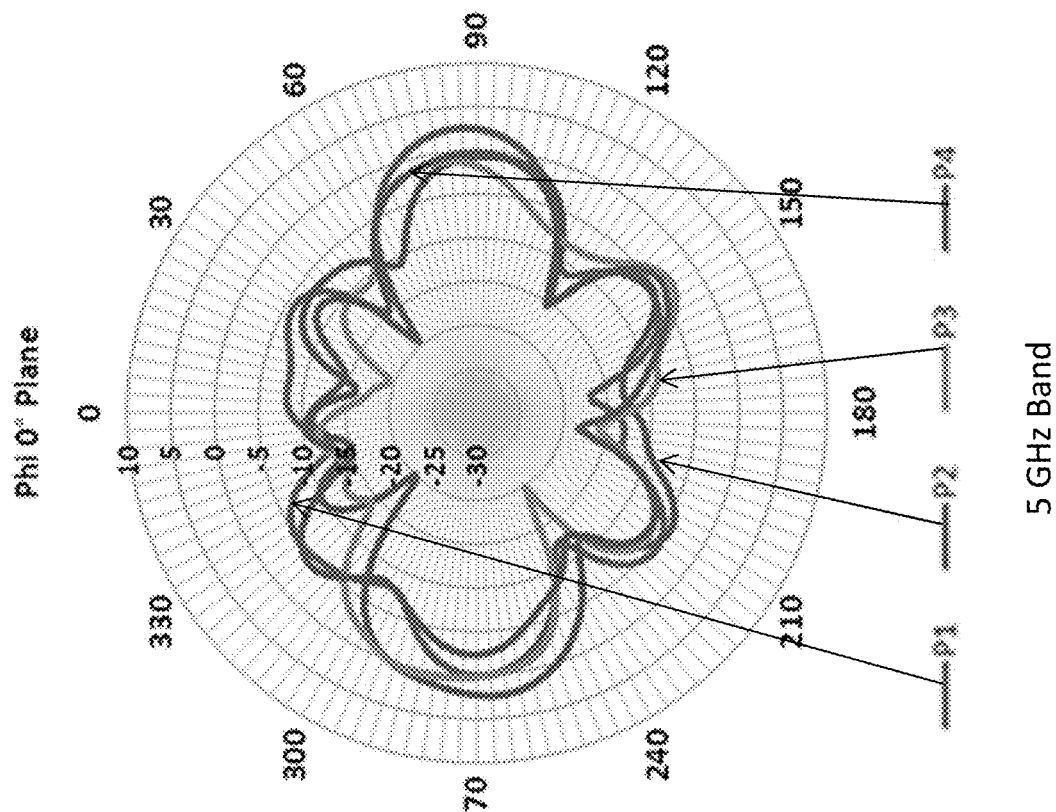
Figure 16A:
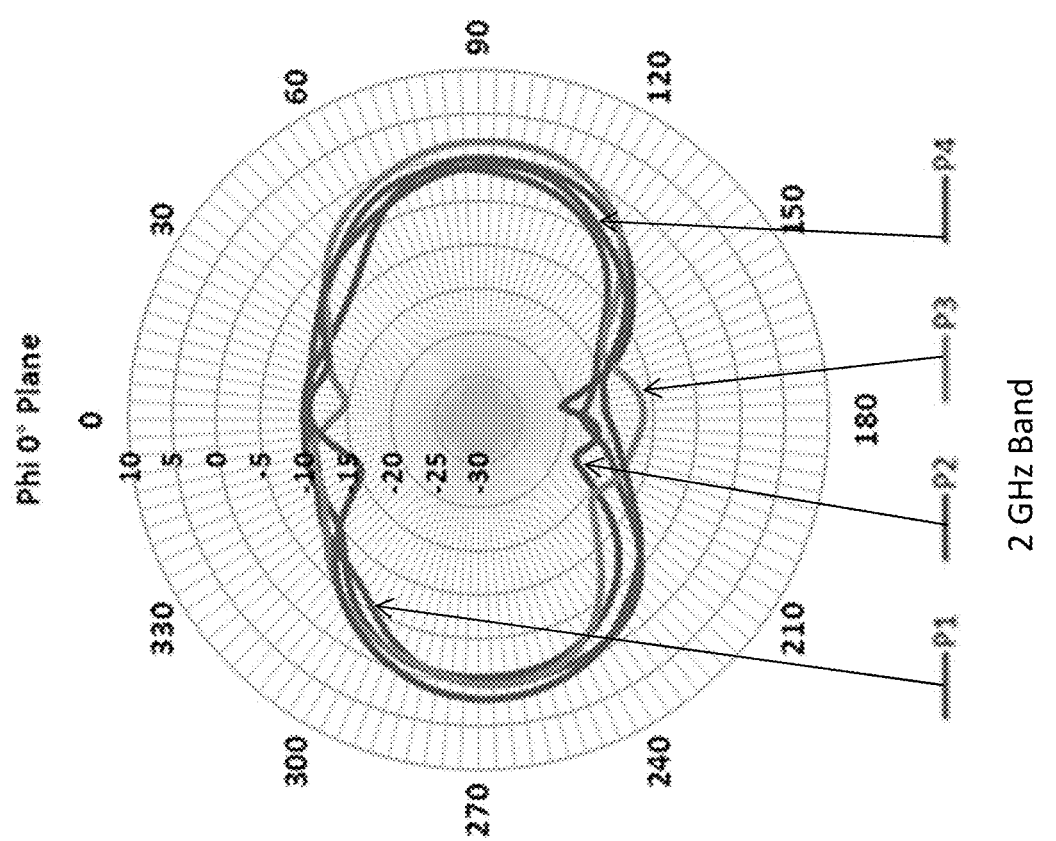
Figure 17B:
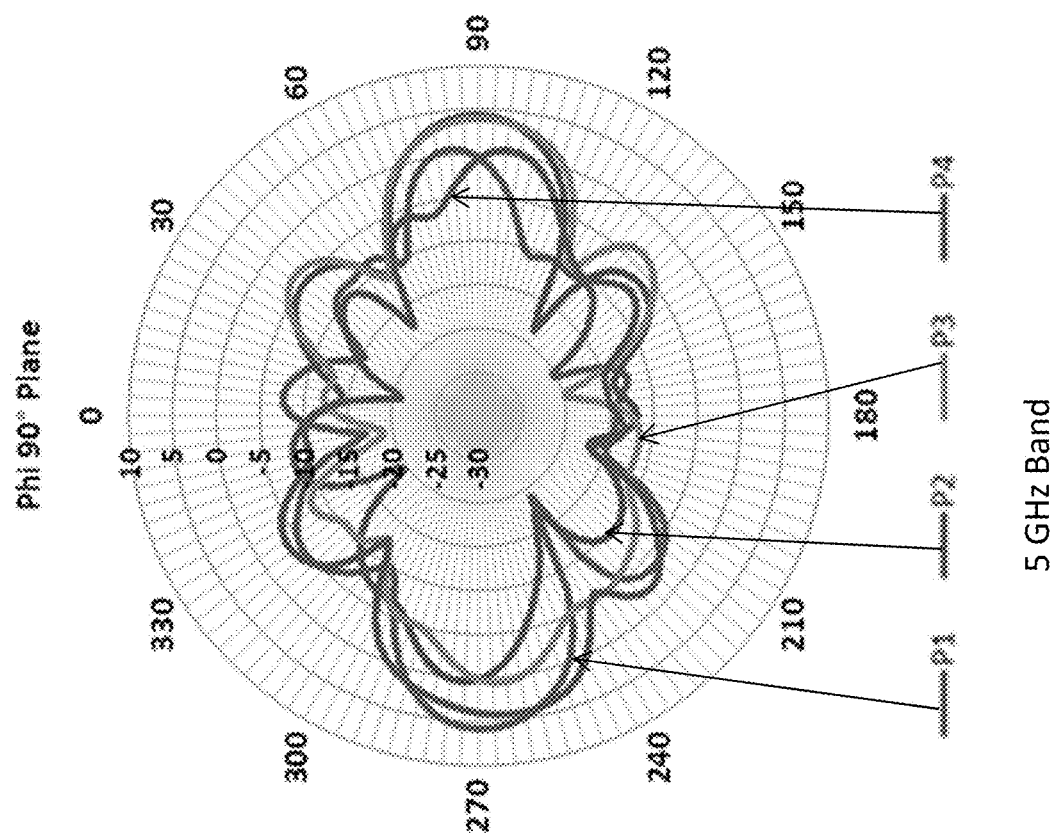
Figure 17A:
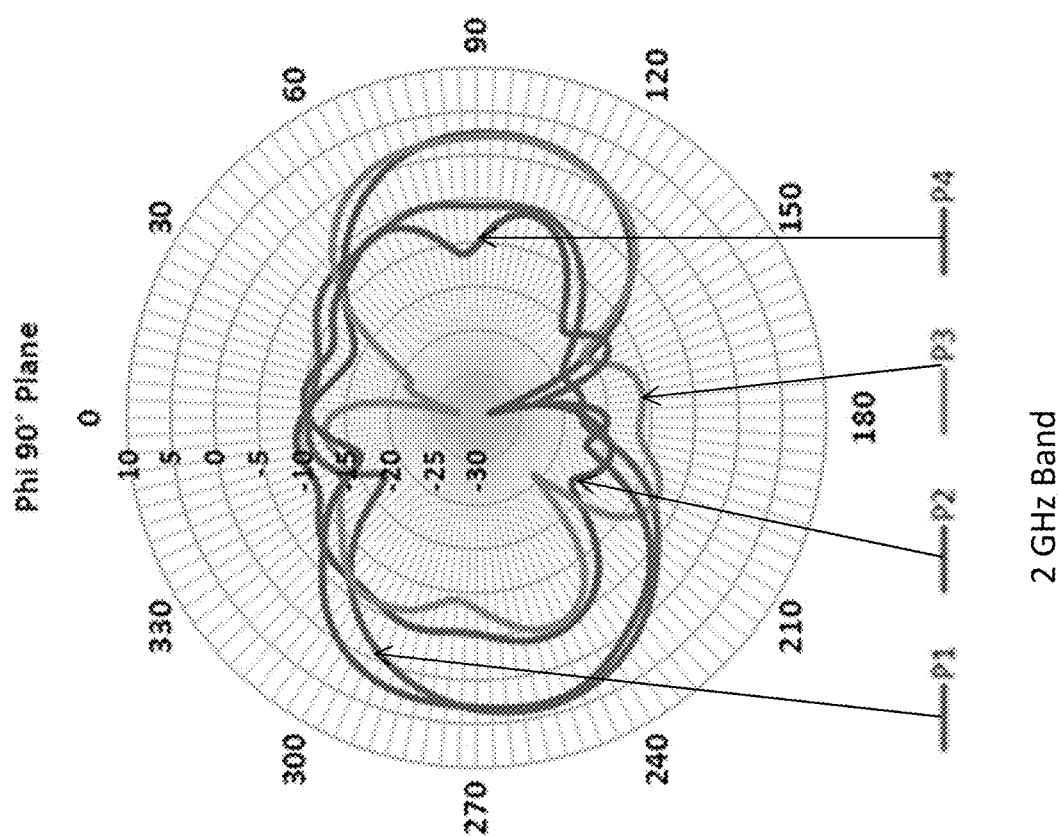
Figure 18:
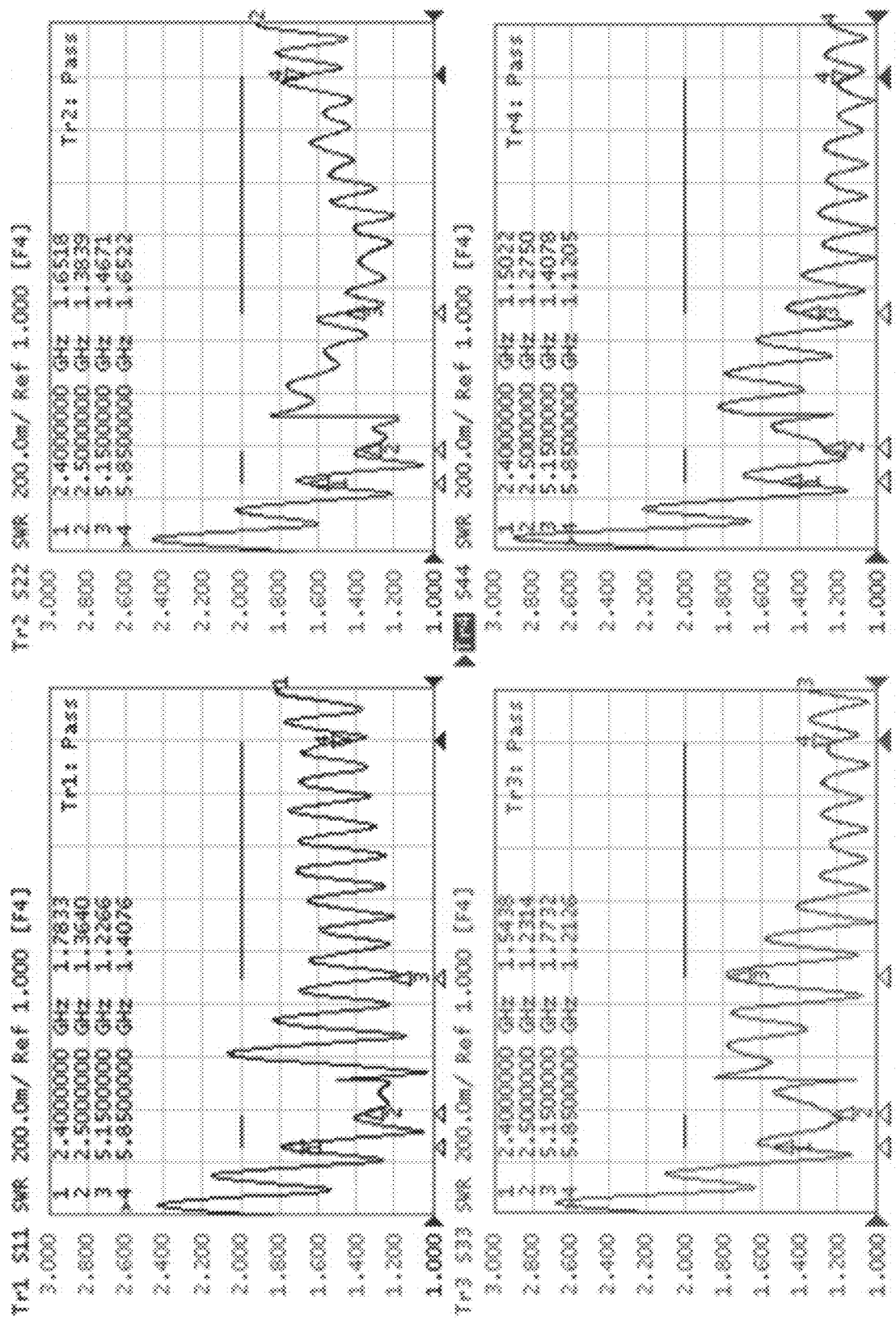
Figure 24B:
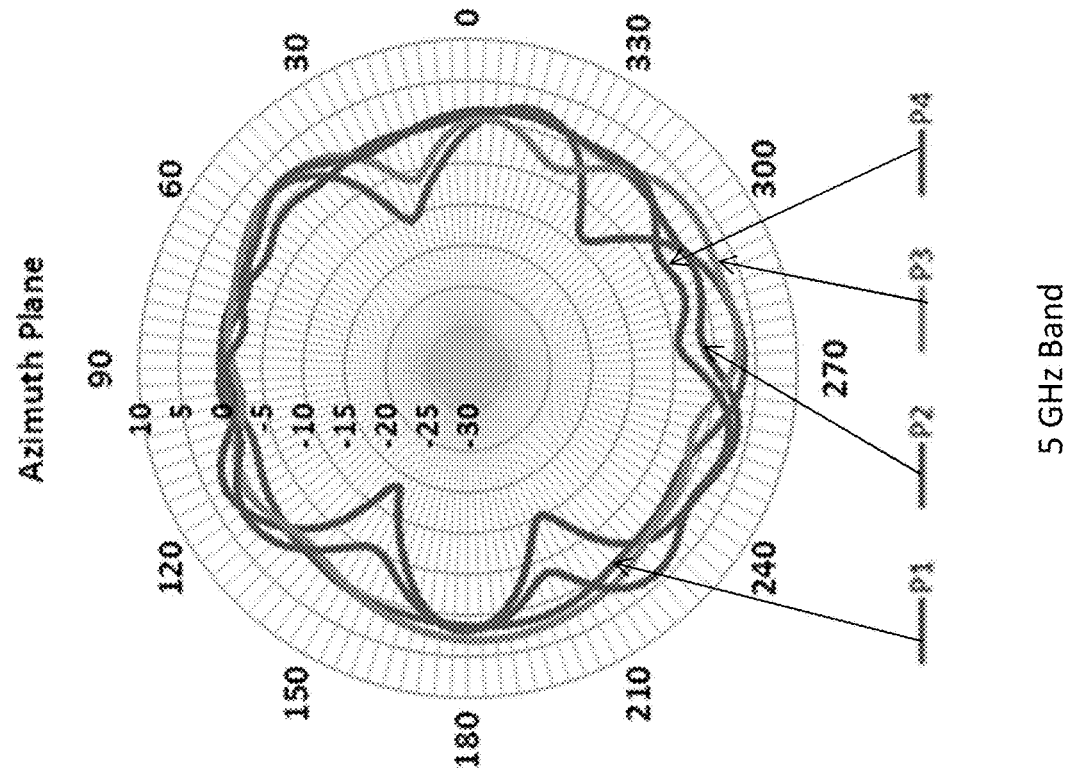
Figure 24A:
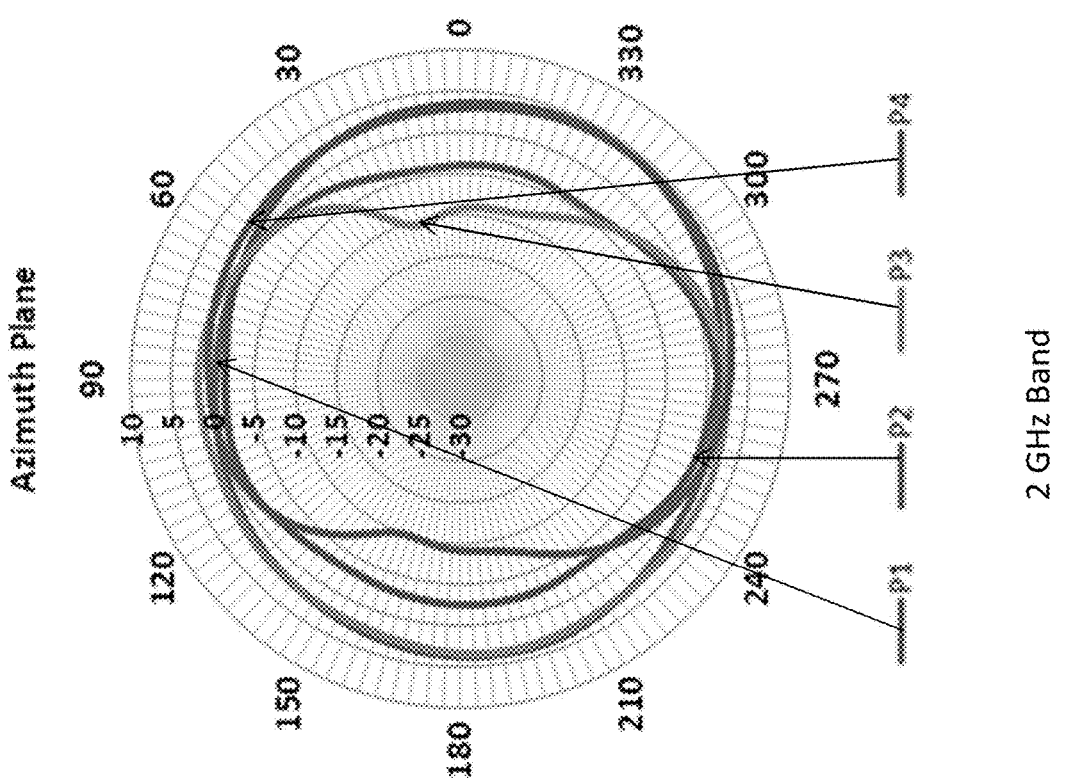
Figure 25B:
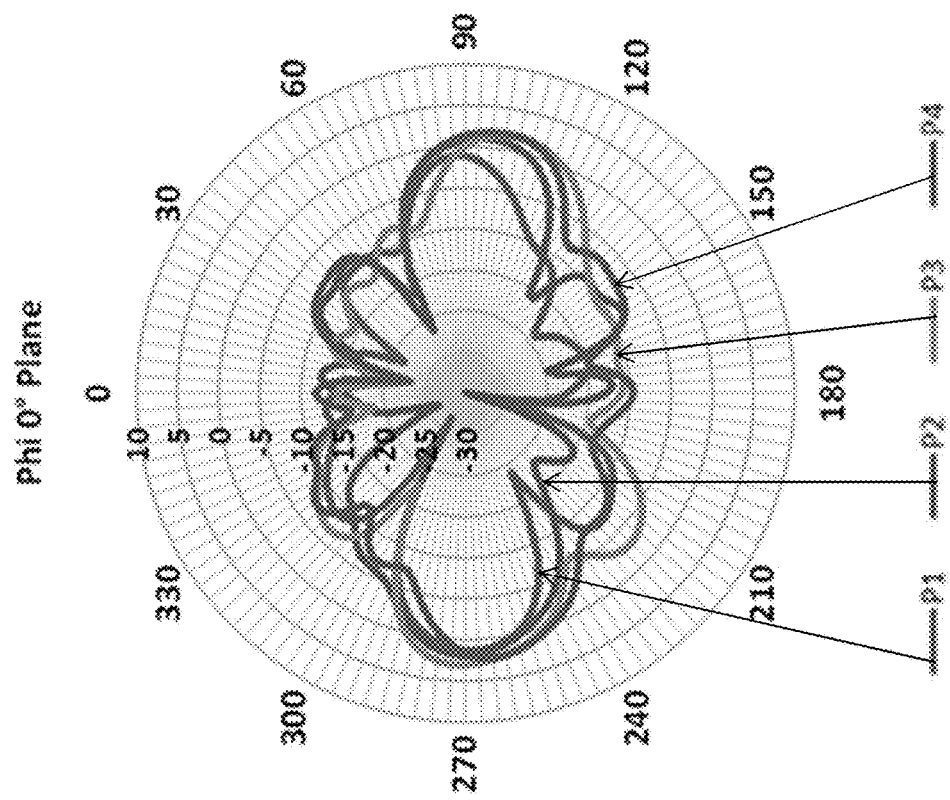
Figure 25A:
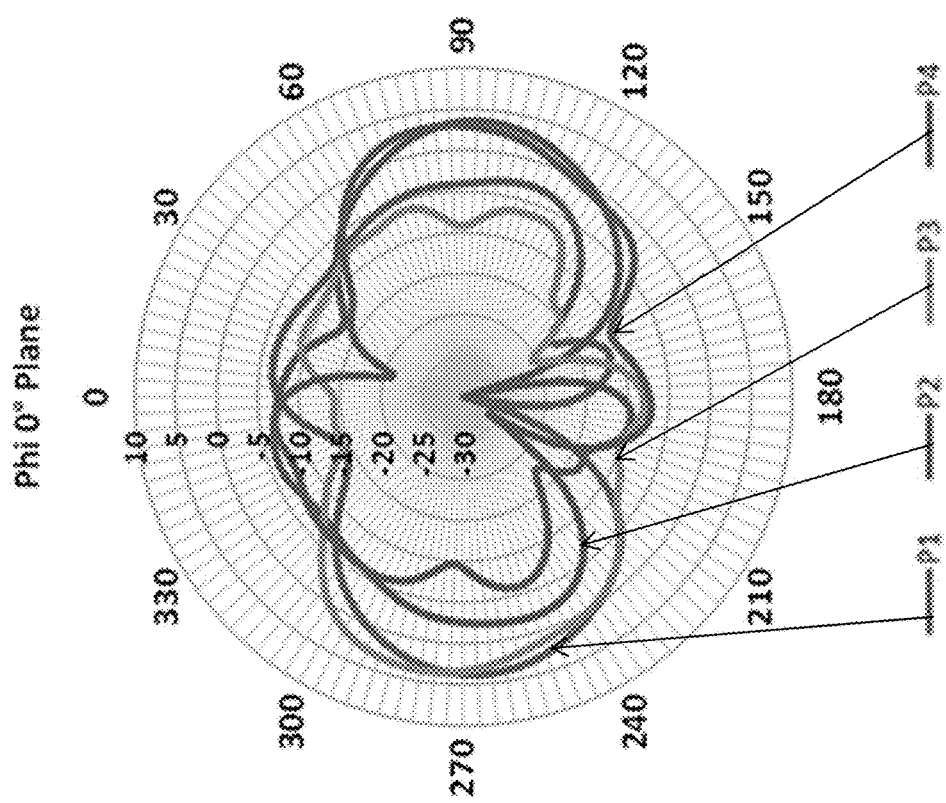
Figure 26B:
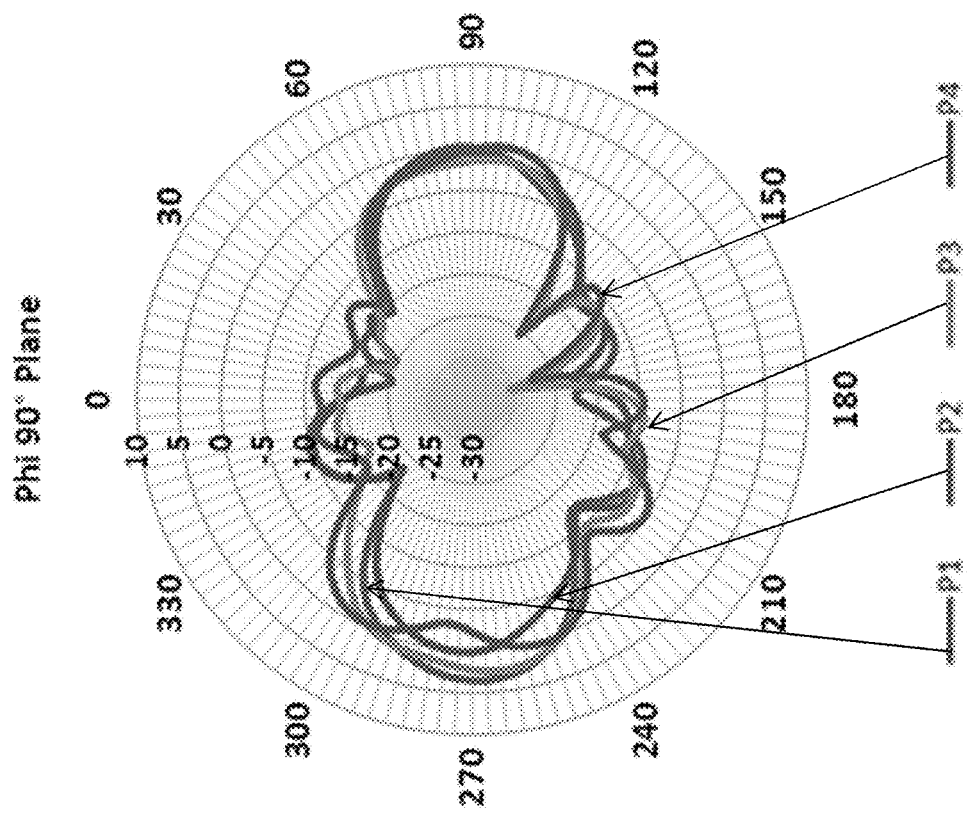
Figure 26A:
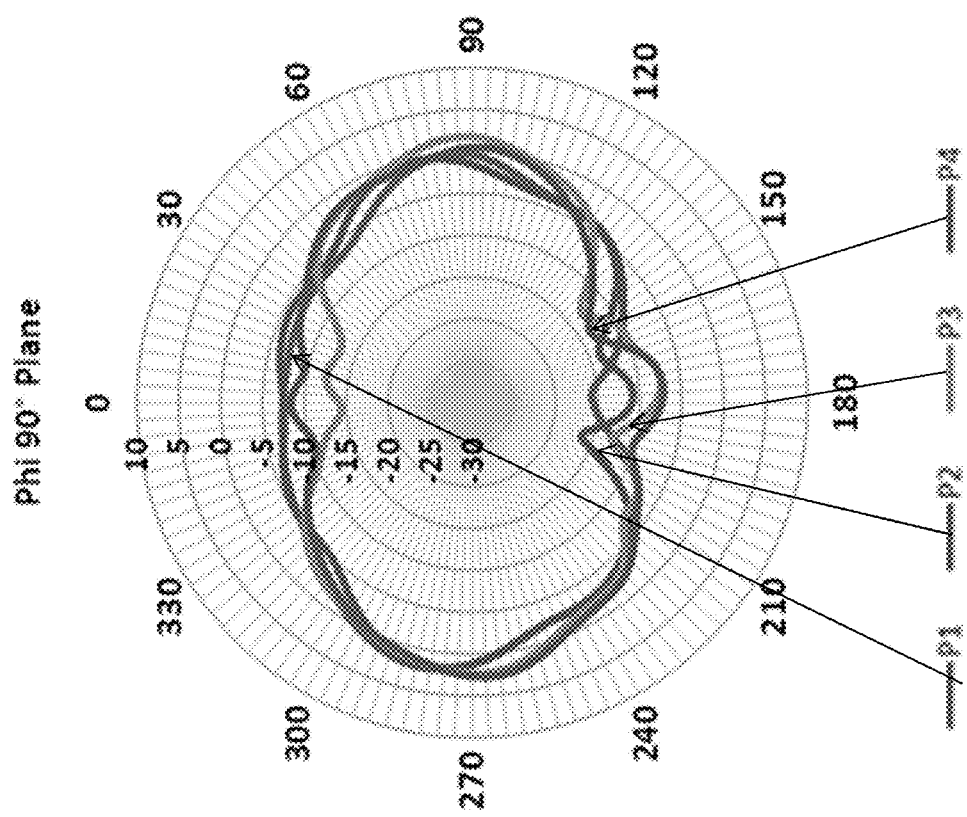

FIG. 13 includes exemplary line graphs of measured voltage standing wave ratio (VSWR) (S11, S22, S33, and S44) versus frequency for each of the four ports of a physical antenna prototype of the multiport dual band high gain antenna assembly shown in FIG. 11;

FIG. 14 includes exemplary line graphs of measured port to port isolation (S21, S31, S41, S32, S42, S43) versus frequency for each of the four of a physical antenna prototype of the multiport dual band high gain antenna assembly shown in FIG. 11;

FIGS. 15A and 15B illustrate measured antenna radiation patterns (Azimuth Plane) within the respective 2.45 GHz and 5 GHz bands for the four ports P1, P2, P3, and P4 of a physical antenna prototype of the multiport dual band high gain antenna assembly shown in FIG. 11;

FIGS. 16A and 16B illustrate measured antenna radiation patterns (Elevation 0 Plane) within the respective 2.45 GHz and 5 GHz bands for the four ports P1, P2, P3, and P4 of a physical antenna prototype of the multiport dual band high gain antenna assembly shown in FIG. 11;

FIGS. 17A and 17B illustrate measured antenna radiation patterns (Elevation 90 Plane) within the respective 2.45 GHz and 5 GHz bands for the four ports P1, P2, P3, and P4 of a physical antenna prototype of the multiport dual band high gain antenna assembly shown in FIG. 11;

FIG. 18 includes exemplary line graphs of measured voltage standing wave ratio (VSWR) (S11, S22, S33, and S44) versus frequency for each of the four ports of a physical antenna prototype of the multiport dual band high gain antenna assembly shown in FIG. 11 with the RF signal feeding network PCB shown in FIG. 12;

FIG. 19 includes exemplary line graphs of measured port to port isolation (S21, S31, S41, S32, S42, S43) versus frequency for each of the four ports of a physical antenna prototype of the multiport dual band high gain antenna assembly shown in FIG. 11 with the RF signal feeding network PCB shown in FIG. 12;

FIGS. 20, 21, 22, and 23 are tables with measured efficiency, gain, ripple, and beamdwith performance data at various frequencies from 2400 megahertz (MHz) to 2500 MHz and from 5150 MHz to 5850 MHz for ports 1, 2, 3, and 4 of a physical antenna prototype of the multiport dual band high gain antenna assembly shown in FIG. 11 with the RF signal feeding network PCB shown in FIG. 12;

FIGS. 24A and 24B illustrate measured antenna radiation patterns (Azimuth Plane) within the respective 2.45 GHz and 5 GHz bands for the four ports P1, P2, P3, and P4 of a physical antenna prototype of the multiport dual band high gain antenna assembly shown in FIG. 11 with the RF signal feeding network PCB shown in FIG. 12;

FIGS. 25A and 25B illustrate measured antenna radiation patterns (Elevation 0 Plane) within the respective 2.45 GHz and 5 GHz bands for the four ports P1, P2, P3, and P4 of a physical antenna prototype of the multiport dual band high gain antenna assembly shown in FIG. 11 with the RF signal feeding network PCB shown in FIG. 12; and FIGS. 26A and 26B illustrate measured antenna radiation patterns (Elevation 90 Plane) within the respective 2.45 GHz and 5 GHz bands for the four ports P1, P2, P3, and P4 of a physical antenna prototype of the multiport dual band high gain antenna assembly shown in FIG. 11 with the RF signal feeding network PCB shown in FIG. 12.

DETAILED DESCRIPTION

Example embodiments will now be described more fully with reference to the accompanying drawings.

Figure 5:
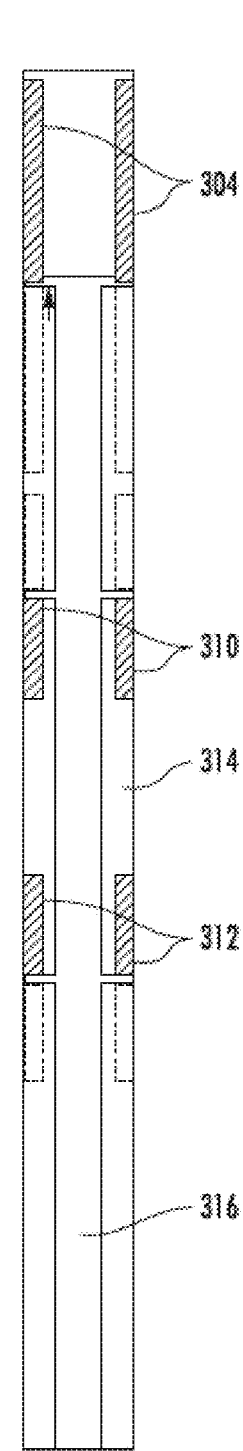
FIG. 5 is a back view of the conventional back-to-back dipole antenna shown in FIG. 3.
Figure 6:
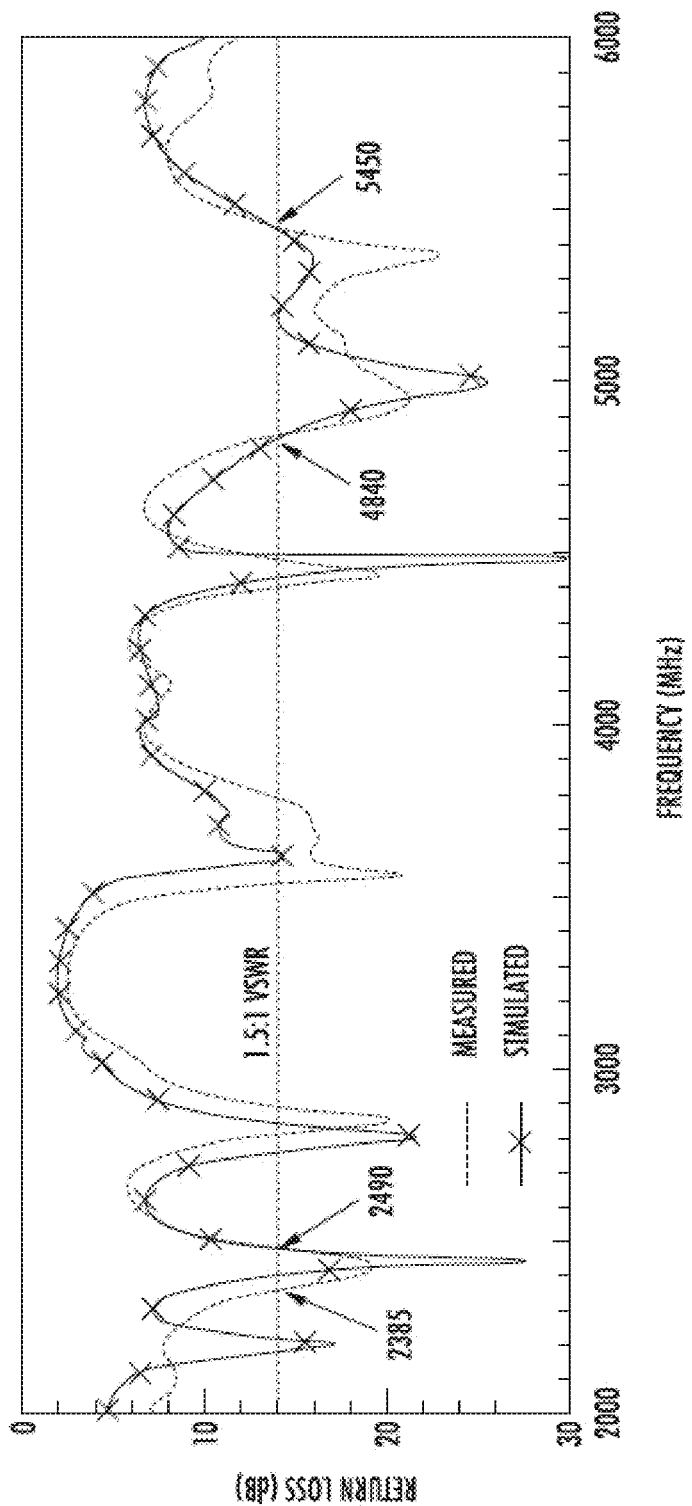
FIG. 6 is a line graph illustrating return loss in decibels for the conventional back-to-back dipole antenna shown in FIGS. 3 through 5 over a frequency range from 2000 megahertz (MHz) to 6000 MHz.

With reference to FIG. 6, there is shown the measured and computer-simulated return loss in decibels for the conventional back-to-back dipole antenna 300 (discussed above and shown in FIGS. 3 through 5) over a frequency range of 2000 MHz to 6000 MHz. In FIG. 6, the dashed horizontal line represents a Voltage Standing Wave Ratio of 1.5:1. In addition, the antenna 300 also had a gain level of about 2.5 in decibels referenced to isotropic gain (dBi) for the 2.45 GHz band, a gain level of about 4.0 dBi for a frequency range of 4.84 GHz to 5.450 GHz, and an omnidirectional ripple of less than 2 dBi.

The 4 dBi gain of the conventional antenna 300 for the 5 GHz band, however, may not be high enough for some applications. The conventional back-to-back dipole arrangement also necessitates a double-sided printed circuit board 314 and a relatively long antenna due to having separate 2.45 GHz and 5 GHz band elements. For example, the conventional antenna 300 shown in FIGS. 3 through 5 included a printed circuit board 314 having a length of about 160 millimeters and a width of about 12 millimeters.

Also, a conventional antenna having a collinear arrangement may not have satisfactory gain properties for wideband applications or dual band applications where the gain variation can be drastic. It is also challenging to configure a collinear dipole antenna with four ports and with high gain while maintaining good isolation between the ports as well as gain patterns that have less null at certain directions across a multiband application. Accordingly, the inventors hereof have disclosed herein corporate feeds (e.g., RF signal feeding network PCBs shown in FIGS. 9, 10, 11, and 12, etc.) for feeding RF signals to dipole array antennas (e.g., 400 in FIG. 7, 400A and 400B in FIG. 8, etc.).

Disclosed herein are exemplary embodiments of omnidirectional multiband symmetrical dipole antennas (e.g., antenna 400 (FIG. 7), etc.) that may provide or include one or more (but not necessarily any or all) of the following advantages or features. For example, exemplary embodiments may be relatively small in size and have a relatively simple structure dipole design. Exemplary embodiments may be for multi-port (e.g., four ports, more than four ports, less than four ports, etc.) antenna radiating element designs and also provide the flexibility of increasing antenna gain performance by adding dipole radiating elements. Exemplary embodiments may have antenna port to port isolation better than −20 decibels. Exemplary embodiments may be more cost effective than conventional antennas by allowing for the use of a single FR4 PCB for the radiator. Exemplary embodiments may provide more control freedom of the gain for the antenna as compared to conventional collinear type antennas.

Figure 1:
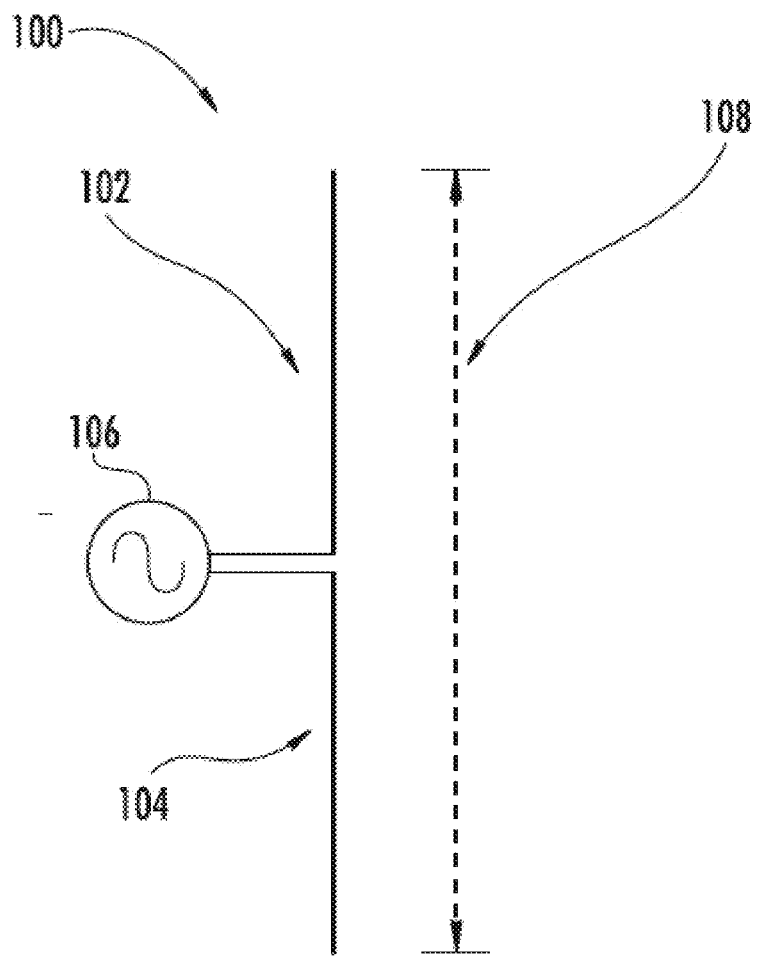
FIG. 1 is a conventional dipole antenna.
Figure 2:
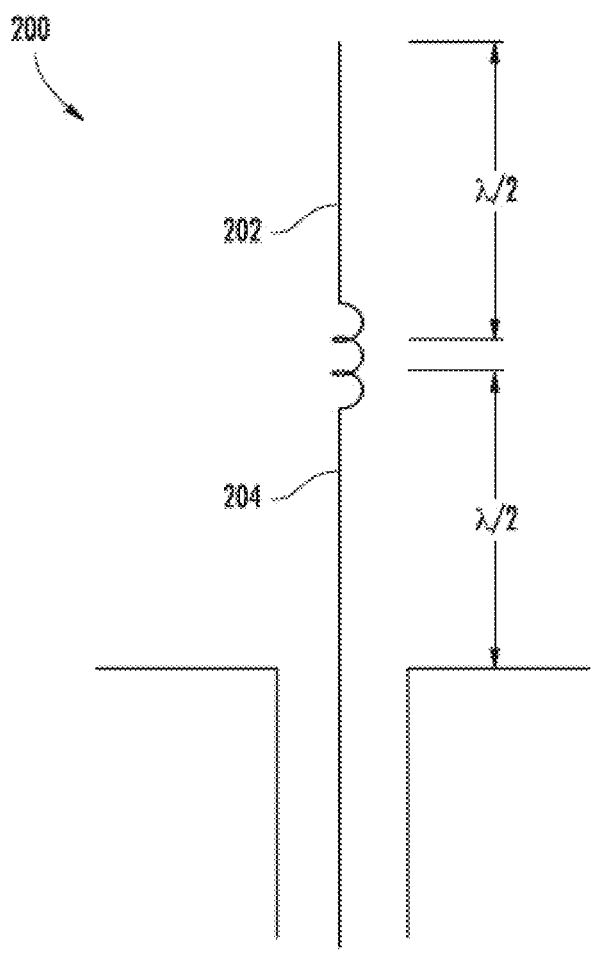
FIG. 2 is a conventional collinear antenna.
Figure 3:
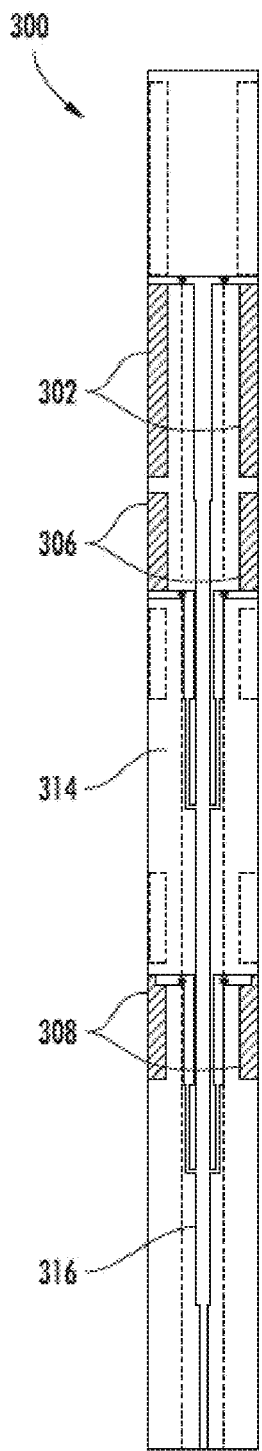
FIG. 3 is a front view of a conventional back-to-back dipole antenna.
Figure 4:
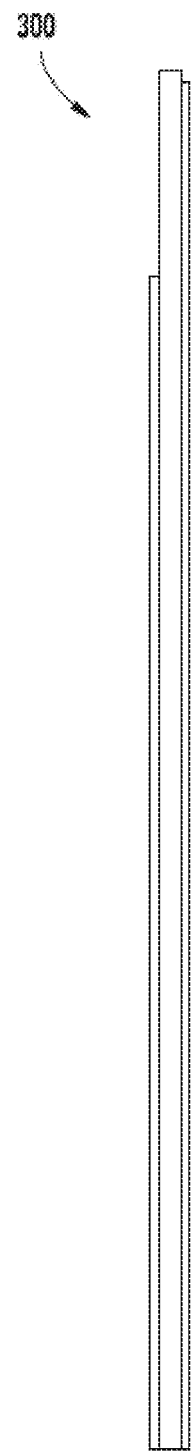
FIG. 4 is a side view of the conventional back-to-back dipole antenna shown in FIG. 3.

Exemplary embodiments may achieve high gain and/or have comparable or better performance than the conventional dipole antenna 300 shown in FIGS. 3 through 5. For example, exemplary embodiments may be able to achieve performance comparable the performance shown in FIG. 6 with a design that is simpler, has improved manufacturability, and/or is more cost effective than the conventional dipole antenna 300.

As disclosed herein, exemplary embodiments may include at least one planar biconical-like dipole (e.g., FIG. 7, etc.) that operates as a dipole antenna with identical elements for the upper radiating element or portion and for the lower ground element or portion at the lower frequency band. Each of the upper radiating element and the lower ground element includes first and second tapering features to improve impedance matching.

First and second slots are introduced to each of the upper radiating element and the lower ground element to provide each with a high band radiating element or portion with resonant frequency at the 5 GHz band (e.g., 5 GHz band radiating element, etc.) and first and second low band radiating elements or arms with resonant frequency at the 2.45 GHz band (e.g., 2.45 GHz band radiating arms, etc.). The first and second low band radiating arms are alongside or adjacent the corresponding high band radiating element. Accordingly, the dipole is thus multiband and operable in at least the 2.45 GHz and 5 GHz bands. Exemplary embodiments are not limited to these frequency ranges or bands as it is possible to tweak for other frequency range depending on the size and dimensions of the antenna.

The first and second tapering features may be considered as integral parts or extensions of the corresponding first and second radiating arms. Stated differently, the first and second radiating arms may include the respective first and second tapering features.

Figure 7:
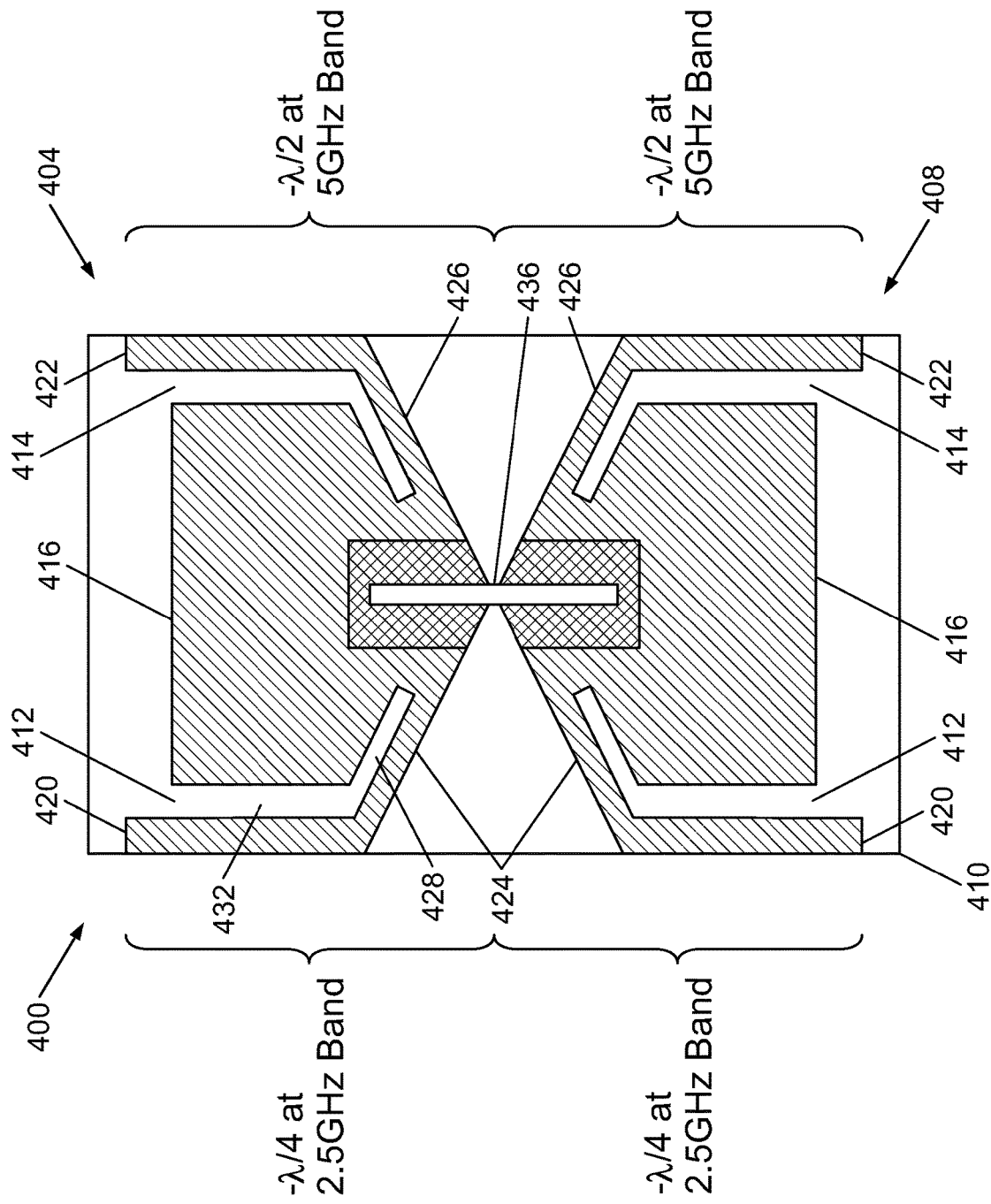
FIG. 7 illustrates an omnidirectional multiband symmetrical dipole antenna according to an exemplary embodiment, where the electrical lengths of one quarter wavelength ($\lambda/4$) and one half wavelength ($\lambda/2$) for the upper radiating portion and the lower ground portion of the antenna at the 2.45 GHz and 5 GHz bands, respectively, are provided for purposes of illustration only.

The slots are tuned so that the low band (e.g., 2.45 GHz band radiating arms and the high band or 5 GHz band radiating elements are matched to have good VSWR performance (e.g., VSWR less than 2.0:1, etc.). Without the properly tuned or designed slots, the antenna VSWR may otherwise mismatch and the radiation pattern may be tilted downward or upward, which may distort the radiation pattern omnidirectionality. Advantageously, the slots offer design freedom to optimize the radiation patterns. With the slots, the lower band radiating elements operate at the low band frequency range with a combined electrical length of half wavelength ($\lambda/2$), which is the sum of the $\lambda/4$ electrical length of the upper radiating element 420 and 422 along the upper radiating portion 404 and the $\lambda/4$ electrical length of the lower radiating element 420 and 422 along the lower ground portion 408 as shown in FIG. 7. For the high band frequency range, these radiating elements 420 and 422 operate with a combined electrical length of one wavelength ($\lambda$), which is the sum of the $\lambda/2$ electrical length of the upper radiating element 420 and 422 along the upper radiating portion 404 and the $\lambda/2$ electrical length of the lower radiating element 420 and 422 along the lower ground portion 408. In such nature, high band has slightly higher gain compared to low band resonant frequency.

To attain higher gain performance, an antenna assembly may include more than one or multiple dipoles or dipole radiating elements in an array arrangement. For example, a printed circuit board may include two dipoles or dipole radiating elements in a stacking array arrangement (e.g., FIG. 8, etc.) in which the two dipoles are stacked one above the other. Within the stacked array arrangement, the distance or spaced distance separating the two dipoles from each other is used to optimize the antenna gain performance.

High gain performance may be achieved by having the dipoles radiate the RF signal simultaneously in the same phase. An RF signal corporate feeding network PCB (e.g., FIGS. 9, 10, 11, and 12, etc.) may be used for feeding the RF signal to the dipoles. The RF signal feeding network may comprise a double sided PCB. The feeding network may include a 50 ohm impedance transmission line and RF power divider. Tapering of the ground plane (e.g., tapering copper trace, etc.) may help to widen the bandwidth. The length and width of the transmission line and RF power divider may be based on the PCB core material dielectric constant. The RF signal may be fed to a feed point along the front of the PCB through an RF coaxial cable or board mount connector. The transmission line may be connected to the feed point, such as by soldering a center core of the coaxial cable or board mount connector to a trace along the front of the PCB. For the ground signal, the coaxial cable braid or board mount connector body is connected (e.g., soldered, etc.) to a tapering ground element (e.g., tapering copper trace, etc.) along a back of the PCB.

The RF signal may be split evenly through the RF power divider along the front of the PCB. The branch line of the RF power divider may be configured for increasing gain of the antenna depending on the number of dipoles.

The feeding of the cable may be located at about or adjacent a center (e.g., at a location midway between the top and bottom edges, etc.) of the feeding network PCB. The RF power divider may also be located close to the center. This may help to reduce the feeding network's impact on the radiation patterns. The cable feeding to the network may be non-parallel (e.g., bent and routed, etc.) to reduce the unbalanced current flow back. The cable feeding may be provided with certain clearance from the PCB to help maintain omnidirectionality of the antenna radiation pattern. Alternatively, other feeding methods may be used besides coaxial cables.

For a multi-port antenna, a plurality of RF signal feeding network PCBs and dipole radiating element PCBs may be place individually inside an antenna housing or radome. Alternatively, the RF feeding network PCB and dipole radiating element PCBs may be combined or assembled as a unit or assembly (e.g., FIG. 11, etc.) onto a base plate, which is then placed inside an antenna housing or radome.

For some applications, a low maximum peak gain in 3D profile may be important. For certain frequency ranges, the antenna may be unable to meet the low maximum peak gain for such applications. Therefore, the antenna may include one or more resistors configured not for broad banding the band but to reduce the gain in some embodiments. For example, one or more resistors may be provided along the RF signal feeding network PCB (e.g., resistors soldered to the feeding board and/or placed directly on via surface mount technology (SMT), etc.) for attenuating RF energy and controlling antenna peak gain performance. During operation, the resistors may be used for separately controlling peak gain for the high and low band according to an exemplary embodiment. Alternatively, other exemplary embodiments may include one or more dipole antennas without any resistors, such as when peak gain is not critical or important.

With reference to FIG. 7, there is shown an example embodiment of an omnidirectional multiband symmetrical dipole antenna 400 including one or more aspects of the present disclosure. As shown, the antenna 400 includes an upper radiating portion 404 and a lower ground portion 408 on a printed circuit board (PCB) 410 (broadly, substrate). The upper radiating portion 404 and lower ground portion 408 are configured such that the antenna 400 is operable essentially as or similar to a standard half wavelength dipole antenna at a first frequency range or low band (e.g., the 2.45 GHz band from 2.4 GHz to 2.5 GHz, etc.) with the upper and lower portions 404, 408 each having an electrical length of about $\lambda/4$. The upper radiating portion 404 and lower ground portion 408 are configured such that the antenna 400 is operable essentially as or similar to a wavelength dipole antenna at a second frequency range or high band (e.g., the 5 GHz band from 4.9 GHz to 5.875 GHz, etc.) with the upper and lower portions 404, 408 each having an electrical length of about $\lambda/2$.

First and second slots 412, 414 are introduced to the upper radiating portion 404 and the lower ground portion 408 to provide each with a respective upper and lower high band radiating element 416 and first and second low band radiating arms 420, 422. The first and second low band radiating arms 420, 422 extend alongside the corresponding high band radiating element 416 of the upper radiating portion 404 and the lower ground portion 408. The first and second low band radiating arms 420, 422 are spaced apart from the corresponding high band radiating element 416 by the respective first and second slots 412, 414. The radiating elements 402 and 422 operate in higher order mode at the second frequency range as a wavelength dipole.

In this example, the high band radiating elements 416 (e.g., copper traces, etc.) are configured to have a resonant frequency within the 5 GHz band, and thus may also be referred to as 5 GHz band radiating elements. The first and second low band radiating arms 420, 422 (e.g., copper traces, etc.) are configured to have a resonant frequency within the 2.45 GHz band, and thus may also be referred to as 2.45 GHz band radiating arms. The radiating elements 402 and 422 operate in a higher order at the second frequency range 5 GHz band as a wavelength dipole. Accordingly, the omnidirectional multiband symmetrical dipole antenna 400 is operable in at least the 2.45 GHz and 5 GHz bands.

Each of the upper radiating portion 404 and lower ground portion 408 includes first and second tapering features 424, 426 for impedance matching. The first and second tapering features 424, 426 may be considered integral parts or extensions of the corresponding first and second radiating arms 420, 422. Stated differently, the first and second radiating arms 420, 422 may include the respective first and second tapering features 424, 426.

As shown in FIG. 7, the illustrated tapering features 424, 426 are generally V-shaped (e.g., having a shape similar to the English alphabetic letter "v"). The tapering features 424, 426 comprise slanted or diagonal portions of the arms 420, 422 (e.g., copper traces, etc.) that extend generally from about a middle or center of the PCB 410 to the corresponding low band radiating arm 420. For the upper radiating portion 404, the first and second tapering features 424, 426 extend upwardly (e.g., at an acute angle of about 30 degrees relative to horizontal, etc.) from about the middle or center of the PCB 410 to the other portion of the corresponding first or second low band radiating arm 420, 422. For the lower ground portion 408, the first and second tapering features 424, 426 extend downwardly (e.g., at an acute angle of about 30 degrees relative to horizontal, etc.) from about the middle or center of the PCB 410 to the other portion of the corresponding first or second low band radiating arm 420, 422.

In the illustrated example of FIG. 7, each of the first and second slots 412, 414 includes a first linear slanted or angled portion 428 and a second linear vertical portion 432. The second linear vertical portion 432 extends from the first linear slanted or angled portion 428 to an open end. The first linear slanted or angled portion 428 extends between and spaces apart the corresponding tapering feature 424, 426 and high band radiating element 416. The second linear vertical portion 432 extends between and spaces apart the corresponding low band radiating arm 420, 422 and high band radiating element 416.

Each high band radiating element 416 includes three linear sides alongside the second linear vertical portion 432 of the corresponding slots 412, 414 and two slanted or diagonal sides alongside the first linear slanted or angled portion 428 of the corresponding slot 412, 414. Each low band radiating arm 420, 422 includes a generally straight or linear portion that is connected to the corresponding tapering feature 424, 426 and that extends alongside the second linear vertical portion 432 of the corresponding slot 412, 414 and beyond the high band radiating element 416.

The slots 412, 414 are generally an absence of electrically-conductive material between radiating elements. By way of example, the upper radiating portion 404 and lower ground portion 408 may be initially formed with the slots 412, 414, or the slots 412, 414 may be formed by removing electrically-conductive material, such as by etching, cutting, stamping, etc. In still yet other embodiments, the slots 412, 414 may be formed by adding electrically nonconductive or dielectric material, such as by printing, etc.

The slots 412, 414 are tuned or configured (e.g., shaped and sized, etc.) so that the low band radiating arms 420, 422 and the high band radiating elements 416 are matched to have good VSWR performance (e.g., VSWR less than 2.0:1, etc.). When the antenna 400 is operating, the slots 412, 414 may help inhibit the antenna radiation pattern from squinting downward and/or may help make the radiation patterns point at horizon. With the slots 412, 414, the high band radiating elements 416 operate with a combined electrical length of about one-half wavelength ($\lambda/2$) for the 5 GHz band, which is the sum of the $\lambda/4$ electrical length of the upper radiating element 416 of the upper radiating portion 404 and the $\lambda/4$ electrical length of the lower radiating element 416 of the lower ground portion 408.

The antenna 400 may be configured to be operable such that the first and second low band radiating arms 420, 422 (including the tapering features 424, 426) of each of the upper radiating portion 404 and lower ground portion 408 have an electrical length of about $\lambda/4$ at the first frequency range or low band. The radiating elements 402 and 422 may operate in higher order at the second frequency range 5 GHz band as a wavelength dipole. The electrical length of the high band radiating elements 416 at the first frequency range may be relatively small such that the high band radiating elements 416 should not really be considered effective radiating elements at the first frequency range. Accordingly, only the low band radiating arms 420, 422 are essentially radiating at the first frequency range. At the second frequency range or high band, the high band radiating elements 416 and low band radiating arms 420, 422 are effective radiators with electrical wavelengths of about $\lambda/4$ and about $\lambda/2$ respectively.

At the first and second frequency ranges, the lower ground portion 408 may be operable as ground, which permits the antenna 400 to be ground independent. Thus, the antenna 400 does not depend on a separate ground element or ground plane. At low band or the first frequency range (e.g., the 2.45 GHz band from 2.4 GHz to 2.5 GHz, etc.), the low band radiating elements 420, 422 (including the first and second tapering features 424, 426) of the lower ground portion 408 have an electrical length of about one quarter wavelength ($\lambda/4$). At the second frequency range or high band (e.g., the 5 GHz band from 4.9 GHz to 5.875 GHz, etc.), the high band radiating element 416 of the lower ground portion 408 has an electrical length of about $\lambda/4$. This allows the antenna 400 to operate essentially like a half wavelength dipole antenna ($\lambda/2$) at both the low and high bands. The radiating elements 402 and 422 also operate in higher order at the second frequency range 5 GHz band as a wavelength dipole. Alternative embodiments may include radiating elements or arms, tapering features, and/or slots configured differently than that shown in FIG. 7, such as for producing different radiation patterns at different frequencies and/or for tuning to different operating bands.

The upper radiating portion 404 and lower ground portion 408 may be identical to each other, e.g., have the same shape and size and made of the same material, etc. The upper radiating portion 404 and the lower ground portion 408 may be symmetrical with respect to a horizontal centerline axis between the upper radiating portion 404 and the lower ground portion 408. The upper radiating portion 404 and lower ground portion 408 may be made of electrically-conductive material, such as, for example, copper, silver, gold, alloys, combinations thereof, other electrically-conductive materials, etc. Or, for example, the upper radiating portion 404 may be made of a different material than the lower ground portion 408.

Figure 9:
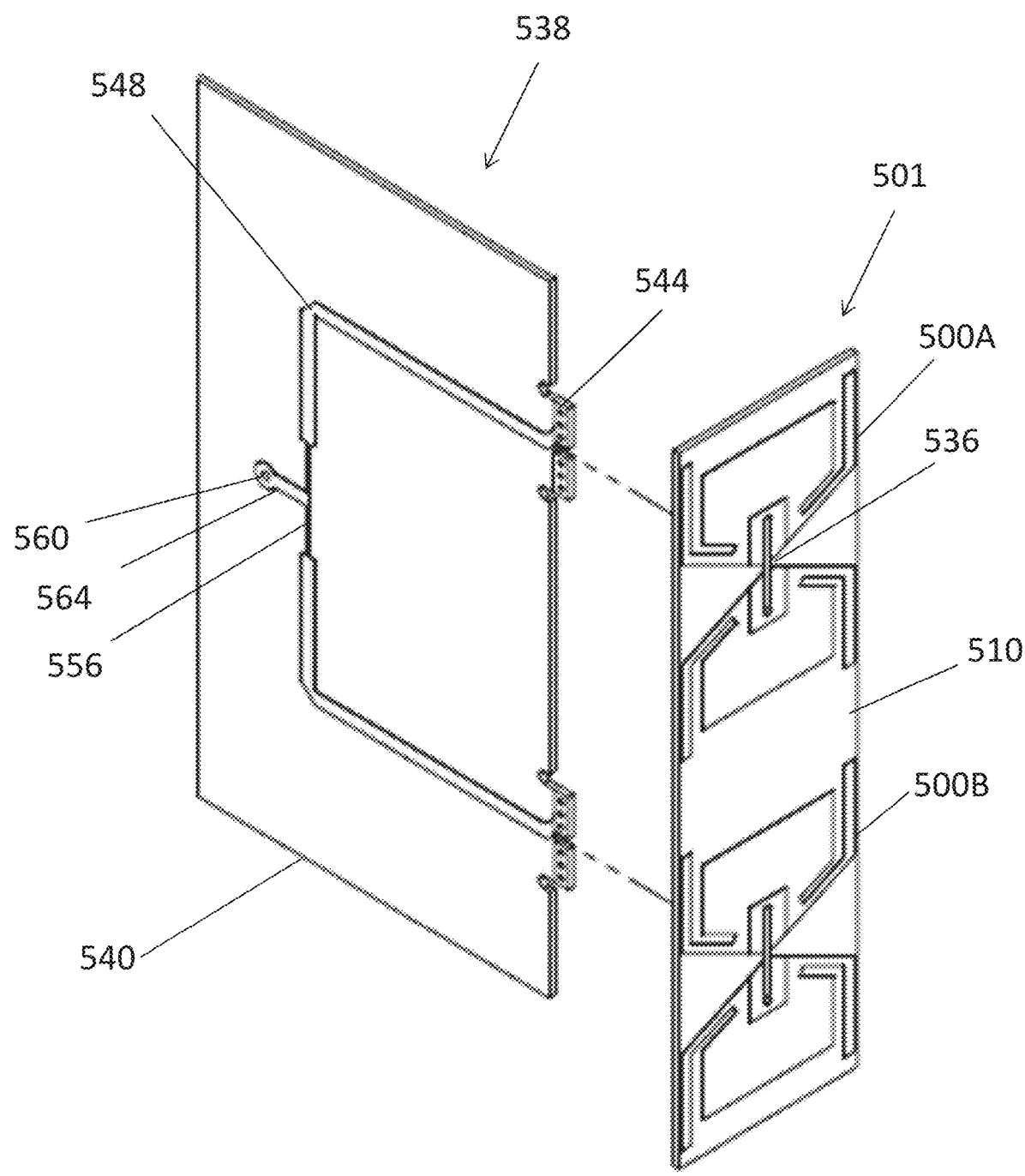
FIGS. 9 and 10 are exploded views showing an exemplary RF signal feeding network PCB for feeding RF signals to the two dipole array PCB shown in FIG. 8 according to an exemplary embodiment, where
Figure 10:
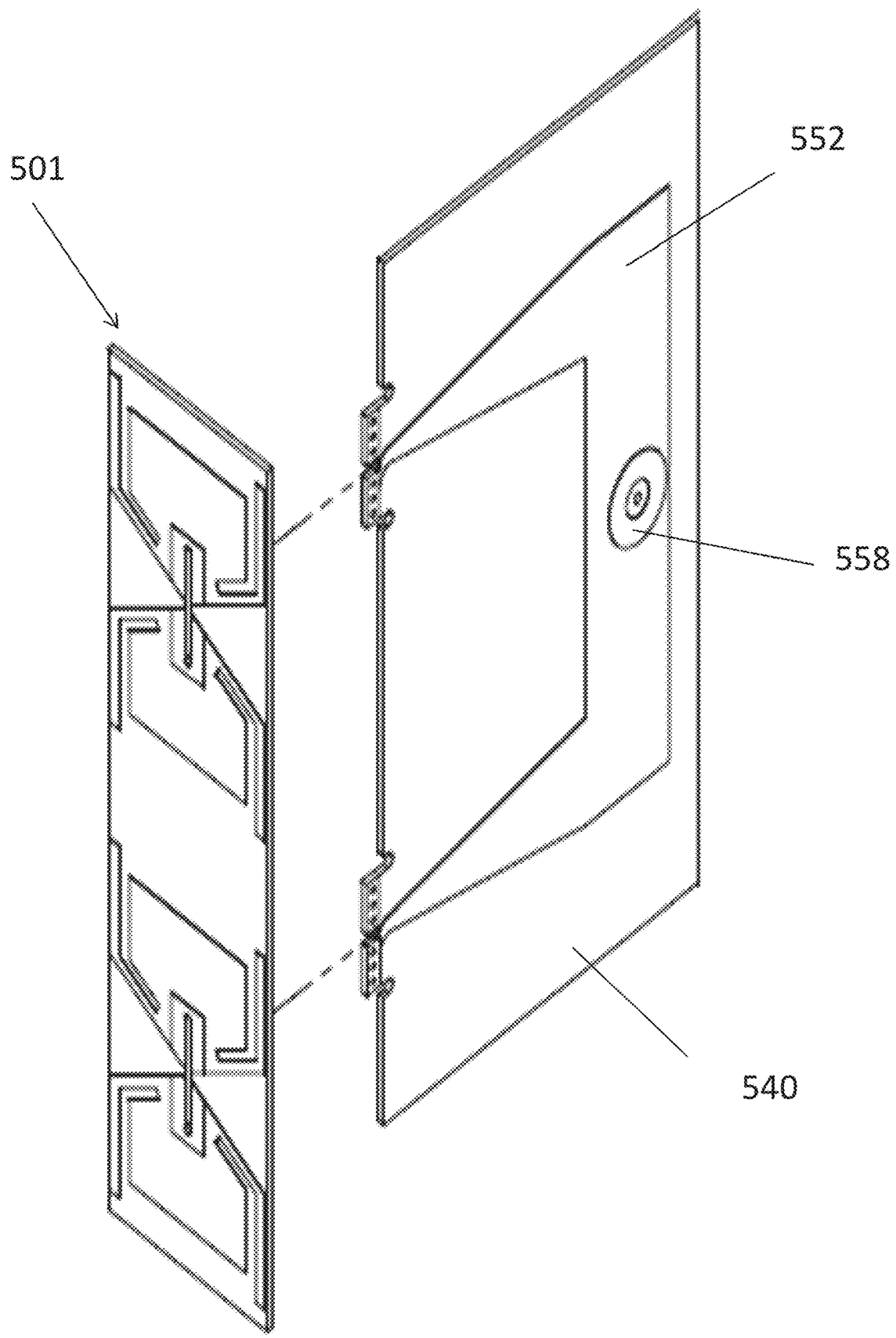

The antenna 400 also includes an opening 436 at about a center of the PCB 410. The opening 436 may be used for coupling the PCB 410 to an RF signal feeding network PCB. For example, FIGS. 9 and 10 show an RF signal feeding network PCB 538 including tabs 544 configured to be inserted within the openings 536 of the PCB 510 to thereby couple the PCBs 510 and 540 to each other.

With reference back to FIG. 7, the upper radiating portion 404 and lower ground portion 408 are on the same side of the PCB 410 (broadly, substrate). The elements may be fabricated or provided in various ways and supported by different types of substrates and materials, such as a circuit board, a flexible circuit board, a plastic carrier, Flame Retardant 4 or FR4, flex-film, etc. In various exemplary embodiments, the PCB 410 comprises a flex material or dielectric or electrically non-conductive printed circuit board material. In embodiments in which the PCB 410 is formed from a relatively flexible material, the antenna 400 may be flexed or configured so as to follow the contour or shape of the antenna housing profile. The PCB 410 may be formed from a material having low loss and dielectric properties. The antenna 400 may be, or may be part of a, printed circuit board (whether rigid or flexible) where the radiating elements are all conductive traces (e.g., copper traces, etc.) on the circuit board substrate. The antenna 400 thus may be a single sided PCB antenna. Alternatively, the antenna 400 (whether mounted on a substrate or not) may be constructed from sheet metal by cutting, stamping, etching, etc. The PCB 410 may be sized differently depending, for example, on the particular application as varying the thickness and dielectric constant of the substrate may be used to tune the frequencies. Alternative embodiments may include a substrate with a different configuration (e.g., different shape, size, material, etc.).

Figure 8:
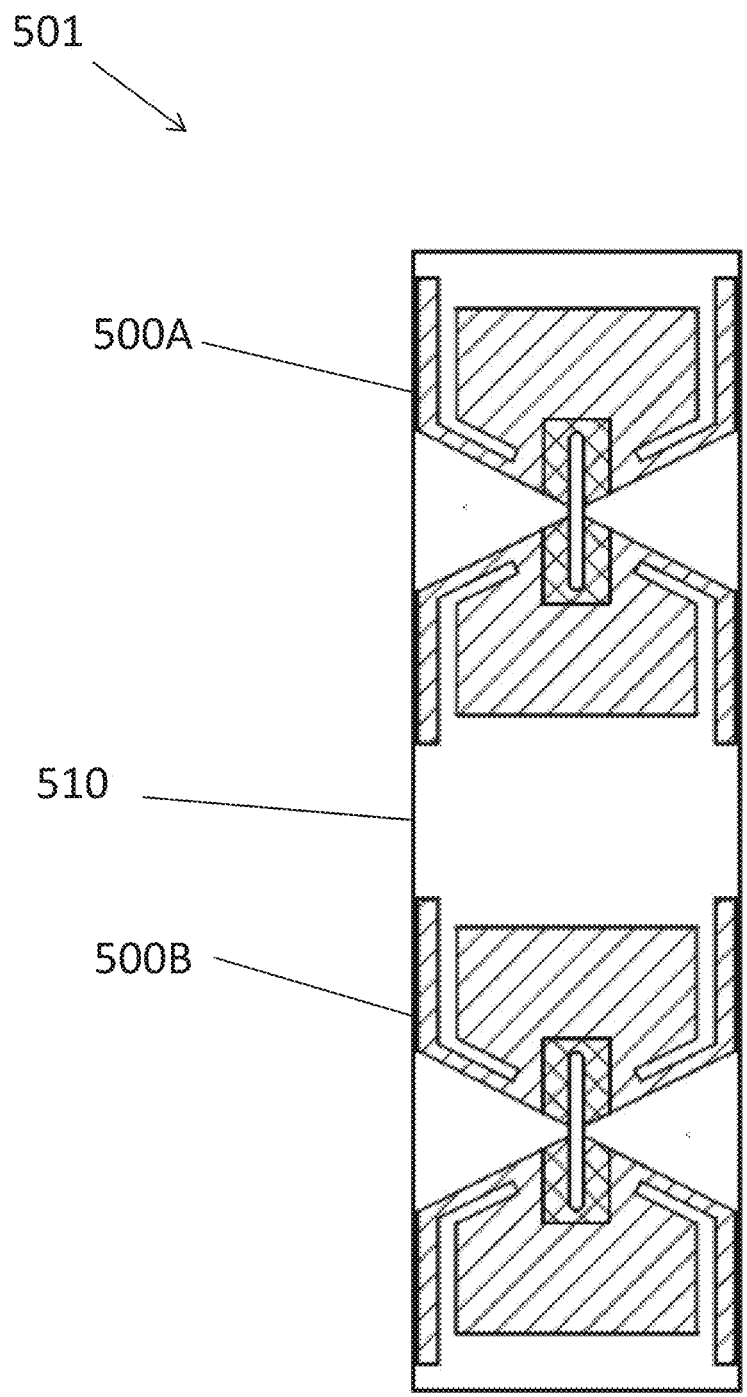
FIG. 8 illustrates an antenna assembly or two-dipole array PCB including a printed circuit board (PCB) with two dipoles or dipole radiating elements as shown in FIG. 7 in a stacking array arrangement according to an exemplary embodiment in which the two dipole radiating elements are stacked one above the other.

FIG. 8 illustrates an exemplary embodiment of an antenna assembly 501 including one or more aspects of the present disclosure. As shown, the antenna assembly 501 includes a PCB 510 (broadly, substrate) having two dipoles or dipole radiating elements 500A, 500B in a stacking array arrangement along the same PCB 510 according to an exemplary embodiment. As shown, the dipole or dipole radiating element 500A is above the other dipole or dipole radiating element 500B. The two dipoles or dipole radiating elements 500A and 500B may have features identical to the corresponding features of the dipole antenna 400 shown in FIG. 7.

Within the stacked array arrangement, the distance or spaced distance separating the two dipole radiating elements 500A, 500B from each other affects antenna gain performance. As compared to the single dipole antenna 400 shown in FIG. 7, higher gain performance at horizon may be attained by having the two dipoles 500A, 500AB radiate the RF signal simultaneously at the same phase.

FIGS. 9 and 10 show an exemplary RF signal feeding network PCB 538 that may be used for feeding RF signals to the two dipoles 500A and 500B along the front of the PCB 510. FIG. 9 shows a microstrip line 548 (e.g., copper trace, etc.) along a front of a PCB 540 (broadly, substrate). FIG. 10 shows a tapering ground trace 552 (e.g., copper trace, etc.) along a back of the PCB 540. Accordingly, the PCB 540 is double sided.

The feeding network may include a 50 ohm impedance transmission line and RF power divider 556 (FIG. 9). Tapering of the ground plane 552 (FIG. 10) may help to widen the bandwidth and provide impedance matching.

The length and width of the transmission line and RF power divider 556 may be based on the core material dielectric constant of the PCB 540. The RF signal may be fed to a feed point 560 along the front of the PCB 540 through an RF coaxial cable or board mount connector. The transmission line may be connected to the feed point 560, such as by soldering a center core of the coaxial cable or board mount connector to a trace 564. For the ground signal, the coaxial cable braid or board mount connector body may be connected (e.g., soldered, etc.) to the portion 558 of the tapering ground trace 552 (e.g., copper trace, etc.) along the back of the PCB 540.

During operation, the RF signal is split evenly through the RF power divider 556 that is located generally between upper and lower end portions of the microstrip line 548. The branch line of the RF power divider 556 may be configured for increasing antenna gain depending on the number of dipoles to which the RF signal is fed.

The feeding of the cable may be located at about or adjacent a center (e.g., at a location midway between the top and bottom edges, etc.) of the feeding network PCB 538. The RF power divider 556 may also be located close to the center. This may help to reduce the feeding network's impact on the antenna radiation patterns. The cable feeding to the network may be non-parallel (e.g., bent and routed, etc.) to reduce the unbalanced current flow back. The cable feeding may be provided with certain clearance from the PCB 540 to help maintain omnidirectionality of antenna radiation performance. Alternatively, other feeding methods may be used besides coaxial cables.

FIG. 11 illustrates an exemplary embodiment of a four-port dual band high gain antenna assembly 601 including one or more aspects of the present disclosure. As shown, the antenna 601 includes four of the two-dipole array PCBs 501 shown in FIG. 8. Each two-dipole array PCB 501 includes two dipoles or dipole radiating elements 500A, 500B (FIG. 7) in a stacking array arrangement along the same PCB 510. The dipoles or dipole radiating elements 500A and 500B may have features identical to the corresponding features of the dipole 400 shown in FIG. 7.

The antenna 601 also includes an RF signal feeding network PCB 638 for feeding RF signals to the eight dipoles or dipole radiating elements 500A, 500B of the four two-dipole array PCBs 501. The RF signal feeding network PCB 638 may have features identical to the corresponding features of the RF signal feeding network PCB 538 shown in FIGS. 9 and 10. For example, the RF signal feeding network PCB 638 includes microstrip lines 648 (e.g., copper traces, etc.) and tapering ground traces 652 (e.g., copper traces, etc.) along a PCB 640 (broadly, substrate). Also, for example, the RF signal feeding network PCB 638 may also include one or more resistors (e.g., resistors 780 in FIG. 12, etc.) along the microstrip lines 648 for attenuating RF energy and controlling antenna peak gain performance.

As shown in FIG. 11, the antenna assembly 601 includes four coaxial cable 672 each of which is respectively coupled to a corresponding microstrip line 648 and tapering ground trace 652 along the PCB 640 of the RF signal feeding network PCB 638. More specifically, the center core of each coaxial cable 672 may be electrically connected to a corresponding feed point 660 by soldering the coaxial cable's center core to a copper trace 654, to thereby connect the center core to the microstrip line 648. For the ground signal, each coaxial cable 672 may be electrically connected to a corresponding tapering ground trace 652 by soldering the coaxial cable braid to the portion 658 of the corresponding tapering ground trace 652. In this exemplary embodiment, the coaxial cable's center core will pass through a via or hole in the PCB 640 for electrical connection to the microstrip line 648, which is along the opposite side of the PCB 640 as the tapering ground trace 552 to which the coaxial cable braid is soldered. Alternative feeding methods may be used in other exemplary embodiments, such as board mount connectors, etc.

The antenna assembly 601 further includes a base plate 676 (broadly, a support). As shown in FIG. 11, the RF signal feeding network PCB 638 and two-dipole array PCBs 501 may be positioned on top of and/or supported by the base plate 676. A housing or radome (not shown) may be positioned over the RF signal feeding network PCB 638 and two-dipole array PCBs 501. The housing or radome may be coupled (e.g., mechanically fastened, etc.) to the base plate 676.

FIG. 12 illustrates another example of an RF signal feeding network PCB 738 that may be used for feeding RF signals to the four two-dipole array PCBs 501 of the multiport dual band high gain antenna assembly 601 shown in FIG. 11 according to an exemplary embodiment. The RF signal feeding network PCB 738 may have features identical to the corresponding features of the RF signal feeding network PCB 538 shown in FIGS. 9 and 10. For example, the RF signal feeding network PCB 738 includes microstrip lines 748 (e.g., copper traces, etc.) and tapering ground traces 752 (e.g., copper traces, etc.) along a PCB 740 (broadly, substrate).

In this exemplary embodiment, two resistors 780 are provided along each of the four microstrip lines 748 of the RF signal feeding network PCB 738. The resistors 780 may be soldered to the PCB 740 and/or the resistors 780 may be placed directly on the PCB 740 via surface mount technology (SMT), etc.). The resistors 780 are configured to be operable for attenuating RF energy and controlling antenna peak gain performance.

For some applications, a low maximum peak gain in 3D profile may be important. For certain frequency ranges, the antenna may be unable to meet the low maximum peak gain for such applications. Therefore, the resistors 780 may be configured not for broad banding the band but to reduce the gain in some embodiments. During operation, the resistors 780 may be used for separately controlling peak gain for the high and low band. Alternatively, other exemplary embodiments may include more or less resistors or no resistors such as when peak gain is not be critical or important. For example, an exemplary embodiment may include two of four ports having two resistors each such that there are a total of four resistors. But alternative embodiments may include four ports each having two resistors such that there are a total of eight resistors. Or, for example, there may be a PI impedance matching network at each antenna port depending on how peak gain of the antenna is controlled.

FIGS. 13 through 17 illustrate measured performance results for the four ports of a physical antenna prototype of the multiport dual band high gain antenna assembly 601 shown in FIG. 11. FIGS. 18 through 26 illustrate measured performance results for the four ports of a physical antenna prototype of the multiport dual band high gain antenna assembly 601 having the RF signal feeding network PCB 738 shown in FIG. 12. These results shown in FIGS. 13 through 26 are provided only for purposes of illustration and not for purposes of limitation.

Generally, FIGS. 13 and 18 show that both prototypes of the multiport dual band high gain antenna assembly had good VSWR (e.g., less than 2.0:1, etc.) for the 2.45 GHz band (e.g., at frequencies of 2.4 GHz and 2.5 GHz, etc.) and the 5 GHz band (e.g., at frequencies of 5.15 GHz and 5.85 GHz, etc.). FIGS. 14 and 19 show that both prototypes of the multiport dual band high gain antenna assembly had good port to port isolation (e.g., better than −20 decibels (dB), etc.) for the 2.45 GHz band (e.g., at frequencies of 2.4 GHz and 2.5 GHz, etc.) and the 5 GHz band (e.g., at frequencies of 5.15 GHz and 5.85 GHz, etc.). FIGS. 15-17 and 24-26 show the omnidirectional radiation patterns (Azimuth Plane, Elevation 0 Plane, and Elevation 90 Plane) within the 2.45 GHz 5 GHz bands for the four ports of both prototypes of the multiport dual band high gain antenna assembly.

The radiating elements disclosed herein may be fabricated or provided in various ways and supported by different types of substrates and materials, such as a circuit board, a flexible circuit board, sheet metal, a plastic carrier, Flame Retardant 4 or FR4, flex-film, etc. Various exemplary embodiments include a substrate comprising a flex material or dielectric or electrically non-conductive printed circuit board material. In exemplary embodiments that include a substrate formed from a relatively flexible material, the antenna may be flexed or configured so as to follow the contour or shape of the antenna housing profile. The substrate may be formed from a material having low loss and dielectric properties. According to some embodiments, an antenna disclosed herein may be, or may be part of a, printed circuit board (whether rigid or flexible) where the radiating elements are all conductive traces (e.g., copper traces, etc.) on the circuit board substrate. In which case, the antenna thus may be a single sided PCB antenna. Alternatively, the antenna (whether mounted on a substrate or not) may be constructed from sheet metal by cutting, stamping, etching, etc. In various exemplary embodiments, the substrate may be sized differently depending, for example, on the particular application as varying the thickness and dielectric constant of the substrate may be used to tune the frequencies. The materials and dimensions provided herein are for purposes of illustration only as an antenna may be made from different materials and/or configured with different shapes, dimensions, etc. depending, for example, on the particular frequency range(s) desired, presence or absence of a substrate, the dielectric constant of any substrate, space considerations, etc.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms (e.g., different materials may be used, etc.) and that neither should be construed to limit the scope of the disclosure. In some example embodiments, well-known processes, well-known device structures, and well-known technologies are not described in detail. In addition, advantages and improvements that may be achieved with one or more exemplary embodiments of the present disclosure are provided for purpose of illustration only and do not limit the scope of the present disclosure, as exemplary embodiments disclosed herein may provide all or none of the above mentioned advantages and improvements and still fall within the scope of the present disclosure.

Specific dimensions, specific materials, and/or specific shapes disclosed herein are example in nature and do not limit the scope of the present disclosure. The disclosure herein of particular values and particular ranges of values (e.g., frequency ranges, etc.) for given parameters are not exclusive of other values and ranges of values that may be useful in one or more of the examples disclosed herein. Moreover, it is envisioned that any two particular values for a specific parameter stated herein may define the endpoints of a range of values that may be suitable for the given parameter (i.e., the disclosure of a first value and a second value for a given parameter can be interpreted as disclosing that any value between the first and second values could also be employed for the given parameter). Similarly, it is envisioned that disclosure of two or more ranges of values for a parameter (whether such ranges are nested, overlapping or distinct) subsume all possible combination of ranges for the value that might be claimed using endpoints of the disclosed ranges.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items. The term "about" when applied to values indicates that the calculation or the measurement allows some slight imprecision in the value (with some approach to exactness in the value; approximately or reasonably close to the value; nearly). If, for some reason, the imprecision provided by "about" is not otherwise understood in the art with this ordinary meaning, then "about" as used herein indicates at least variations that may arise from ordinary methods of measuring or using such parameters. For example, the terms "generally", "about", and "substantially" may be used herein to mean within manufacturing tolerances.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements, intended or stated uses, or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An antenna assembly comprising:
    at least four substrates, each said substrate including at least two antennas along a same side of the substrate in a stacked array arrangement in which the antennas are vertically stacked one above the other; and
    a printed circuit board configured for feeding signals to the antennas, the printed circuit board including opposite first and second side edge portions;
    wherein:
        at least two said substrates are vertically stacked one above the other along the first side edge portion of the printed circuit board, such that at least four said antennas are vertically stacked one above the other along the first side edge portion of the printed circuit board; and
        at least two other said substrates are vertically stacked one above the other along the second side edge portion of the printed circuit board, such that at least four other said antennas are vertically stacked one above the other along the second side edge portion of the printed circuit board.

2. The antenna assembly of claim 1, wherein each said antenna comprises an upper radiating portion and a lower ground portion, wherein each of the upper radiating portion and the lower ground portion includes:
    first and second radiating arms;
    a radiating element generally between the first and second radiating arms;
    first and second tapering features;
    a first slot including a first portion generally between the first tapering feature and the radiating element and a second portion generally between the first radiating arm and the radiating element; and a second slot including a first portion generally between the second tapering feature and the radiating element and a second portion generally between the second radiating arm and the radiating element.

3. The antenna assembly of claim 2, wherein the first and second radiating arms, the radiating element, the first and second tapering features, and the first and second slots of the upper radiating portion are identical to the first and second radiating arms, the radiating element, the first and second tapering features, and the first and second slots of the lower ground portion.

4. The antenna assembly of claim 2, wherein the upper radiating portion and the lower ground portion are symmetrical with respect to a centerline axis defined between the upper radiating portion and the lower ground portion.

5. The antenna assembly of claim 2, wherein the first and second radiating arms include the respective first and second tapering features.

6. The antenna assembly of claim 2, wherein:
each said antenna is operable within a first frequency range with the first and second radiating arms of each of the upper radiating portion and the lower ground portion having an electrical length of about $\lambda/4$; and
each said antenna is operable within a second frequency range with the radiating element of each of the upper radiating portion and the lower ground portion having an electrical length of about $\lambda/4$ and with the first and second radiating arms of each of the upper radiating portion and the lower ground portion having an electrical length of about $\lambda/2$.

7. The antenna assembly of claim 6, wherein:
the first frequency range is the 2.45 gigahertz band from about 2.4 gigahertz to about 2.5 gigahertz, and
the second frequency range is the 5 gigahertz band from about 4.9 gigahertz to about 5.875 gigahertz.

8. The antenna assembly of claim 2, wherein:
the first and second slots enable multiband operation of the corresponding antenna; and
the first and second tapering features are operable for impedance matching.

9. The antenna assembly of claim 2, wherein:
the first and second tapering features of the upper radiating portion comprise a generally V-shaped edge of the first and second radiating arms of the upper radiating portion that is spaced apart from and oriented so as to point generally toward the lower ground portion; and
the first and second tapering features of the lower ground portion comprise a generally V-shaped edge of the first and second radiating arms of the lower ground portion that is spaced apart from and oriented so as to point generally toward the upper radiating portion.

10. The antenna assembly of claim 2, wherein:
the first and second tapering features of the upper radiating portion comprise portions of the corresponding first and second radiating arms that extend upwardly at an acute angle relative to horizontal from about a middle of the corresponding antenna; and
the first and second tapering features of the lower ground portion comprise portions of the corresponding first and second radiating arms that extend downwardly at an acute angle relative to horizontal from about the middle of the corresponding antenna.

11. The antenna assembly of claim 2, further comprising a plurality of printed circuit boards each supporting the upper radiating portion and the lower ground portion of a corresponding one of the antennas on a same side of the printed circuit board, and wherein the first and second radiating arms, the radiating element, the first and second tapering features of the upper radiating portion and the lower ground portion comprise conductive traces on the printed circuit board.

12. The antenna assembly of claim 1, further comprising an RF signal feeding network printed circuit board for feeding RF signals to the antennas, wherein the RF signal feeding network printed circuit board includes at least one microstrip line and at least one tapering ground element.

13. The antenna assembly of claim 12, further comprising a coaxial cable having a cable braid soldered at or along the tapering ground element and a center core soldered to a feed point electrically connected to the microstrip line.

14. The antenna assembly of claim 12, further comprising one or more resistors along the microstrip line for attenuating RF energy and controlling antenna peak gain performance.

15. The antenna assembly of claim 1, wherein the printed circuit board comprises a feeding network configured such that:
the antennas are fed by the feeding network perpendicularly or non-parallel to the antennas; and/or
cable feeding to the feeding network is perpendicular or non-parallel to the feeding network.

16. An antenna assembly comprising a substrate, a plurality of antennas along a same side of the substrate in a stacked array arrangement in which the antennas are stacked one above the other, and an RF signal feeding network printed circuit board for feeding RF signals to the antennas, wherein the RF signal feeding network printed circuit board includes at least one microstrip line and at least one tapering ground element;
wherein each said antenna comprises an upper radiating portion and a lower ground portion; and
wherein each of the upper radiating portion and the lower ground portion includes:
first and second radiating arms;
a radiating element generally between the first and second radiating arms;
first and second tapering features;
a first slot including a first portion generally between the first tapering feature and the radiating element and a second portion generally between the first radiating arm and the radiating element; and
a second slot including a first portion generally between the second tapering feature and the radiating element and a second portion generally between the second radiating arm and the radiating element;
wherein the antenna assembly further comprises a coaxial cable having a cable braid soldered at or along the tapering ground element and a center core soldered to a feed point electrically connected to the microstrip line.

17. A multiport antenna assembly comprising:
a plurality of substrates, each substrate including at least two antennas stacked one above the other along a same side of the substrate; and
an RF signal feeding network printed circuit board for feeding RF signals to the antennas, wherein the RF signal feeding network printed circuit board includes a plurality of microstrip lines and a plurality of tapering ground elements;
wherein each said antenna comprises an upper radiating portion and a lower ground portion; and
wherein each of the upper radiating portion and the lower ground portion includes:

first and second radiating arms;
a radiating element generally between the first and second radiating arms;
first and second tapering features;
a first slot including a first portion generally between the first tapering feature and the radiating element and a second portion generally between the first radiating arm and the radiating element; and
a second slot including a first portion generally between the second tapering feature and the radiating element and a second portion generally between the second radiating arm and the radiating element.

18. The multiport antenna assembly of claim 17, further comprising a plurality of coaxial cables each having a cable braid soldered at or along a corresponding one of the tapering ground elements and a center core soldered to a feed point electrically connected to a corresponding one of the microstrip lines.

19. The multiport antenna assembly of claim 17, further comprising two resistors along each of the microstrip lines for attenuating RF energy and controlling antenna peak gain performance.

20. A four-port antenna assembly comprising:
four substrates, each substrate including two antennas stacked one above the other along a same side of the substrate;
an RF signal feeding network printed circuit board for feeding RF signals to the antennas, wherein the RF signal feeding network printed circuit board includes four microstrip lines and four tapering ground elements;
four coaxial cables each having a cable braid soldered at or along a corresponding one of the four tapering ground elements and a center core soldered to a feed point electrically connected to a corresponding one of the four microstrip lines; and
two resistors along each of the four microstrip lines for attenuating RF energy and controlling antenna peak gain performance;
wherein each said antenna comprises an upper radiating portion and a lower ground portion; and
wherein each of the upper radiating portion and the lower ground portion includes:
first and second radiating arms;
a radiating element generally between the first and second radiating arms;
first and second tapering features;
a first slot including a first portion generally between the first tapering feature and the radiating element and a second portion generally between the first radiating arm and the radiating element; and
a second slot including a first portion generally between the second tapering feature and the radiating element and a second portion generally between the second radiating arm and the radiating element.

21. A multiport antenna assembly comprising:
a plurality of substrates, each substrate including at least two antennas stacked one above the other along a same side of the substrate;
an RF signal feeding network printed circuit board for feeding RF signals to the antennas, wherein the RF signal feeding network printed circuit board includes a plurality of microstrip lines and a plurality of tapering ground elements;
a plurality of coaxial cables each having a cable braid soldered at or along a corresponding one of the tapering ground elements and a center core soldered to a feed point electrically connected to a corresponding one of the microstrip lines;
two resistors along each of the microstrip lines for attenuating RF energy and controlling antenna peak gain performance; and
wherein each antenna comprises an upper radiating portion and a lower ground portion; and
wherein each of the upper radiating portion and the lower ground portion includes:
first and second radiating arms;
a radiating element generally between the first and second radiating arms;
first and second tapering features;
a first slot including a first portion generally between the first tapering feature and the radiating element and a second portion generally between the first radiating arm and the radiating element; and
a second slot including a first portion generally between the second tapering feature and the radiating element and a second portion generally between the second radiating arm and the radiating element.

\* \* \* \* \*